United States Patent
Greiner et al.

(10) Patent No.: US 9,182,984 B2
(45) Date of Patent: Nov. 10, 2015

(54) LOCAL CLEARING CONTROL

(75) Inventors: Dan F. Greiner, San Jose, CA (US); Gustav E. Sittmann, III, Webster Groves, MO (US); Cynthia Sittmann, legal representative, Webster Groves, MO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 192 days.

(21) Appl. No.: 13/524,612

(22) Filed: Jun. 15, 2012

(65) Prior Publication Data

US 2013/0339657 A1    Dec. 19, 2013

(51) Int. Cl.
G06F 12/10 (2006.01)
G06F 9/30 (2006.01)

(52) U.S. Cl.
CPC ........ G06F 9/30043 (2013.01); G06F 12/1009 (2013.01); *G06F 12/1027* (2013.01)

(58) Field of Classification Search
CPC .................................................. G06F 12/1009
USPC .............................................. 711/1–200, 207
See application file for complete search history.

(56) References Cited

U.S. PATENT DOCUMENTS

| | | |
|---|---|---|
| 4,432,053 A | 2/1984 | Gaither et al. |
| 4,779,188 A | 10/1988 | Gum et al. |
| 5,307,502 A | 4/1994 | Watanabe et al. |
| 5,317,705 A | 5/1994 | Gannon et al. |
| 5,317,710 A | 5/1994 | Ara et al. |
| 5,423,014 A | 6/1995 | Hinton et al. |
| 5,471,593 A | 11/1995 | Branigin |
| 5,500,948 A | 3/1996 | Hinton et al. |
| 5,551,013 A | 8/1996 | Beausoleil et al. |
| 5,555,394 A | 9/1996 | Arakawa et al. |
| 5,574,873 A | 11/1996 | Davidian et al. |
| 5,615,354 A | 3/1997 | Hill et al. |
| 5,761,734 A | 6/1998 | Pfeffer et al. |
| 5,771,365 A | 6/1998 | McMahan et al. |

(Continued)

FOREIGN PATENT DOCUMENTS

| | | |
|---|---|---|
| DE | 3825028 A1 | 7/1987 |
| DE | 195 16 949 A1 | 2/1998 |
| DE | 199 34 515 A1 | 1/2000 |
| EP | 0206653 B1 | 6/1986 |
| EP | 0220451 | 5/1987 |
| EP | 1182570 A2 | 5/2001 |
| JP | 58150195 A | 9/1983 |
| JP | 58150196 A | 9/1983 |
| WO | WO 02/86730 | 2/2002 |

OTHER PUBLICATIONS

"z/Architecture Principles of Operation," IBM Publication No. SA22-7832-08, Aug. 2010.

(Continued)

*Primary Examiner* — Cheng-Yuan Tseng
*Assistant Examiner* — Zubair Ahmed
(74) *Attorney, Agent, or Firm* — William A. Kinnaman, Jr.

(57) ABSTRACT

A computer implemented instruction is executed. One or more translation table entry locations (TLB) are specified by the instruction. Based on a local-clearing (LC) control specified by the instruction being a first value, the processor selectively clears TLBs in a plurality of the CPUs in a configuration of entries corresponding to the determined translation table entry location. Based on the local-clearing (LC) being a second value, the processor selectively clears only the TLBs of the CPU executing the instruction of entries corresponding to the determined translation table entry location. A computer program product, computer system and computer implemented method are provided.

20 Claims, 6 Drawing Sheets

(56) References Cited

U.S. PATENT DOCUMENTS

| | | | |
|---|---|---|---|
| 5,790,825 | A | 8/1998 | Traut |
| 5,928,353 | A | 7/1999 | Yamada |
| 5,946,717 | A | 8/1999 | Uchibori |
| 6,009,261 | A | 12/1999 | Scalzi et al. |
| 6,079,013 | A | 6/2000 | Webb et al. |
| 6,119,204 | A | 9/2000 | Chang et al. |
| 6,119,219 | A | 9/2000 | Webb et al. |
| 6,260,130 | B1 | 7/2001 | Liedtke |
| 6,308,255 | B1 | 10/2001 | Gorishek, IV et al. |
| 6,463,582 | B1 | 10/2002 | Lethin et al. |
| 6,467,007 | B1 | 10/2002 | Armstrong et al. |
| 6,587,964 | B1 | 7/2003 | Brooks |
| 6,604,187 | B1 | 8/2003 | McGrath et al. |
| 6,978,357 | B1 | 12/2005 | Hacking et al. |
| 6,996,698 | B2 | 2/2006 | Slegel et al. |
| 7,020,761 | B2 | 3/2006 | Slegel et al. |
| 7,197,585 | B2 | 3/2007 | Farrell et al. |
| 7,231,506 | B2 | 6/2007 | Ike |
| 7,284,100 | B2 | 10/2007 | Slegel et al. |
| 7,530,067 | B2 | 5/2009 | Slegel et al. |
| 8,122,224 | B2 | 2/2012 | Slegel et al. |
| 2002/0029357 | A1 | 3/2002 | Charnell |
| 2004/0064618 | A1 | 4/2004 | Farrell et al. |
| 2004/0230749 | A1* | 11/2004 | Slegel et al. ............... 711/144 |
| 2004/0230796 | A1 | 11/2004 | Lundvall et al. |
| 2010/0332721 | A1* | 12/2010 | Yamada et al. ............... 711/6 |
| 2011/0040950 | A1* | 2/2011 | Handgen ............... 711/206 |
| 2011/0119466 | A1* | 5/2011 | Slegel et al. ............... 711/206 |
| 2013/0339656 | A1 | 12/2013 | Greiner |

OTHER PUBLICATIONS

Delphion listing showing docket family of DE3825028 including US5317710 and a view showing English translation of the abstract of the DE3825028C2, publication date: Jan. 7, 1993.

Patent Cooperation Treaty from the International Searching Authority, Date of mailing Sep. 9, 2004, International Application No. PCT/GB2004/001971, International filing date May 6, 2004, 9 pages.

European Patent Office, Extended European Search Report, Reference POU920030050EP2, Date of mailing Oct. 10, 2006, Application No. 05108507.4, 7 pages.

European Patent Office, Partial European Search Report, Reference POU920030050EP3, Date of mailing Apr. 6, 2006, Application No. 05108510.8-2211, 5 pages.

European Patent Office, Extended European Search Report, Reference POU920030050EP3, Date of mailing Jun. 21, 2006, Application No. 05108510.8-2211, 9 pages.

European Patent Office, Extended European Search Report, Reference POU920030050EP4, Date of mailing Aug. 16, 2006, Application No. 06116358.0, 6 pages.

European Patent Office, Extended European Search Report, Reference POU920030050EP5, Date of mailing May 28, 2008, Application No. 08150756.8-1229, 7 pages.

The Patent Office Patents Directorate, Search and Examination Report, Reference: POU920030050GB2, Application No. GB0518904.8, Oct. 31, 2005, 5 pages.

The Patent Office Patents Directorate, Search and Examination Report, Reference: POU920030050GB3, Application No. GB0518901.4, Oct. 31, 2005, 3 pages.

"Enterprise Systems Architecture/390 Principles of Operation", SA22-7201-07, Jul. 31, 2001, pp. 10-1, 10-26-10-27.

"Query Evaluation Techniques for Large Databases" G. Graefe, ACM Computing Surveys, vol. 25, No. 2, Jun. 1993, pp. 73-170. (98 pages).

"Tree Bitmap: Hardware/Software IP Lookups with Incremental Updates" W. Eatherton et al., ACM Sigcomm Computer Communications Review, vol. 34, No. 2: Apr. 2004, pp. 97-122. (26 pages).

"Key-sequence data sets on indelible storage," IBM Journal of Research and Development, vol. 30, No. 3, pp. 230-241, May 1986 (abstract only).

"Storage-Key-Exception Control", , IBM Technical Disclosure Bulletin, vol. 24, No. 3, p. 1400, Aug. 1981.

"System/370 Extended Architecture", SA22-7095, 1985.

International Search Report and Writen Opinion mailed Oct. 21, 2013, PCT/EP2013/060346.

* cited by examiner

LOCAL CLEARING CONTROL

BACKGROUND

1. Technical Field

This invention relates, in general, to processing within a computing environment, and in particular, to selectively clearing a local Translation Lookaside Buffer (TLB) of a processor or a plurality of Translation Lookaside Buffers of a plurality of processors.

2. Description of Related Art

As described in U.S. Pat. No. 7,284,100, INVALIDATING STORAGE, CLEARING BUFFER ENTRIES, AND AN INSTRUCTION THEREFORE, filed May 12, 2003, which is hereby incorporated by reference, selected units of storage, such as segments of storage or regions of storage, are invalidated. The invalidation is facilitated by the setting of invalidation indicators located in data structure entries corresponding to the units of storage to be invalidated. Additionally, buffer entries associated with the invalidated units of storage or other chosen units of storage are cleared. An instruction is provided to perform the invalidation and/or clearing. Moreover, buffer entries associated with a particular address space are cleared, without any invalidation. This is also performed by the instruction. The instruction can be implemented in software, hardware, firmware or some combination thereof, or it can be emulated.

SUMMARY

In an embodiment, a computer program product for selectively clearing a local Translation Lookaside Buffer (TLB) of a processor or a plurality of Translation Lookaside Buffers of a plurality of processors is provided. The computer program product includes: computer readable storage medium having program code embodied therewith, the program code readable by a computer processor to perform a method. The method includes: executing, by the processor, an instruction. The executing includes: determining one or more translation table entry locations specified by the instruction; based on a local-clearing (LC) control specified by the instruction being a first value, selectively clearing TLBs in a plurality of processors in a configuration, of entries corresponding to the determined translation table entry location; and based on the local-clearing (LC) being a second value, selectively clearing only the TLBs of the processor of the configuration executing the instruction, of entries corresponding to the determined translation table entry location.

In another embodiment, a computer system for selectively clearing a local Translation Lookaside Buffer (TLB) of a processor or a plurality of Translation Lookaside Buffers of a plurality of processors is provided. The system includes: a memory; and a processor configured to communicate with the memory. The computer system is configured to perform a method which includes: executing, by the processor, an instruction. The executing includes: determining one or more translation table entry locations specified by the instruction; based on a local-clearing (LC) control specified by the instruction being a first value, selectively clearing TLBs in a plurality of processors in a configuration, of entries corresponding to the determined translation table entry location; and based on the local-clearing (LC) being a second value, selectively clearing only the TLBs of the processor of the configuration executing the instruction, of entries corresponding to the determined translation table entry location.

In a further embodiment, a computer implemented method for selectively clearing a local Translation Lookaside Buffer (TLB) of a processor or a plurality of Translation Lookaside Buffers of a plurality of processors is provided. The method includes: executing, by the processor, an instruction. The executing includes: determining one or more translation table entry locations specified by the instruction; based on a local-clearing (LC) control specified by the instruction being a first value, selectively clearing TLBs in a plurality of processors in a configuration, of entries corresponding to the determined translation table entry location; and based on the local-clearing (LC) being a second value, selectively clearing only the TLBs of the processor of the configuration executing the instruction, of entries corresponding to the determined translation table entry location.

Additional features and advantages are realized through the techniques described. Other embodiments and aspects are described in detail herein and are considered included.

BRIEF DESCRIPTION OF THE DRAWINGS

Additional objects, features, and advantages are apparent from the following detailed description taken in conjunction with the accompanying drawings in which.

DETAILED DESCRIPTION OF THE PREFERRED EMBODIMENTS

Figure 1:
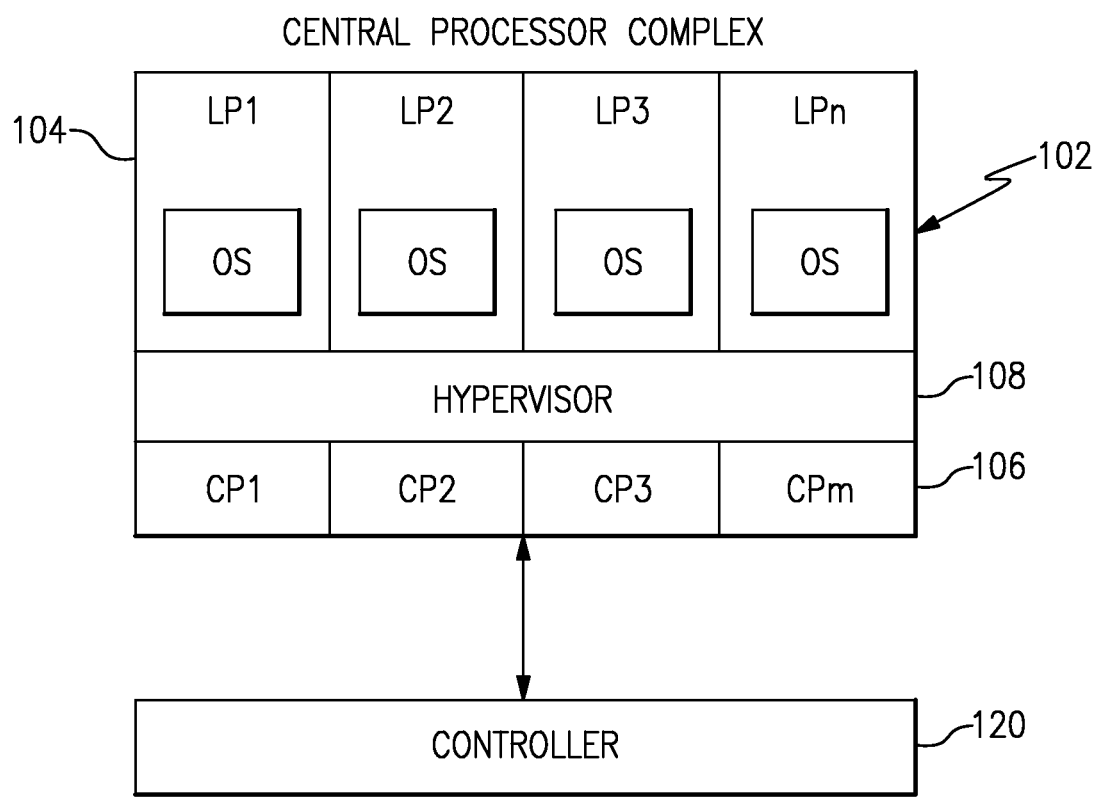
FIG. 1 depicts one embodiment of a computing environment incorporating and using one or more aspects.

Computing environments may use virtual storage which is normally maintained in auxiliary storage to increase the size of available storage. When a page of virtual storage is referenced, the virtual address used in referencing the page is translated by dynamic address translation to a real storage address. If the translation is successful, then the virtual storage is valid; otherwise, it is invalid. A page of virtual storage is indicated as valid or invalid by an invalid bit in a page table entry, which entry includes a real storage address if the page is valid.

Pages of storage can be invalidated a page at a time. For instance, in a computing environment based on the z/Architecture, offered by International Business Machines Corporation, an instruction, referred to as an Invalidate Page Table Entry (IPTE) instruction, is used to invalidate one or more pages of virtual storage. Invalidation includes setting an invalid indicator in a control structure, associated with virtual storage and located in physical main storage, to indicate that a virtual address of a location in the virtual storage cannot be translated by dynamic address translation to a physical main storage address, also called a real address. Further, the instruction is used to clear internal machine buffer entries associated with the page, which entries may be used during dynamic address translation to avoid accessing the control structures in physical main storage. For instance, in the z/Architecture, there are Translation Lookaside Buffers used during dynamic address translation of virtual addresses to real addresses. When a page of storage is invalidated, the corresponding buffers are also cleared of entries associated with that page.

There are also instructions that enable the purging of entire Translation Lookaside Buffers. For instance, in the z/Architecture, an instruction referred to as a Compare and Swap and Purge (CSP) instruction, purges all entries of Translation Lookaside Buffers in all CPUs in the configuration; PURGE TLB clears all entries of the TLB on the CPU which executes the instruction.

Translation-Lookaside Buffer

To enhance performance, the dynamic-address-translation mechanism normally is implemented such that some of the information specified in the region tables, segment tables, and page tables is maintained in a special buffer, referred to as the translation-lookaside buffer (TLB). The CPU necessarily refers to a DAT-table entry in real or absolute storage only for the initial access to that entry. This information may be placed in the TLB, and subsequent translations may be performed by using the information in the TLB. For consistency of operation, the virtual-equals-real translation specified by a real-space designation also may be performed by using information in the TLB. The presence of the TLB affects the translation process to the extent that (1) a modification of the contents of a table entry in real or absolute storage does not necessarily have an immediate effect, if any, on the translation, (2) a region-first-table origin, region-second-table origin, region-third-table origin, segment-table origin, or real-space token origin in an address-space-control element (ASCE) may select a TLB entry that was formed by means of an ASCE containing an origin of the same value even when the two origins are of different types, and (3) the comparison against the table length in an address-space-control element may be omitted if a TLB equivalent of the designated table is used. In a multiple-CPU configuration, each CPU has its own TLB.

Entries within the TLB are not explicitly addressable by the program.

Information is not necessarily retained in the TLB under all conditions for which such retention is permissible. Furthermore, information in the TLB may be cleared under conditions additional to those for which clearing is mandatory.

TLB Structure

The description of the logical structure of the TLB covers the implementation by all systems operating as defined by z/Architecture. The TLB entries are considered as being of six types: TLB region-first-table entries, TLB region-second-table entries, TLB region-third-table entries (collectively called TLB region-table entries), TLB segment-table entries, TLB page-table entries, and TLB real-space entries. A TLB region-table entry, TLB segment-table entry, or TLB page-table entry is considered as containing within it both the information obtained from the table entry in real or absolute storage and the attributes used to fetch this information from storage. A TLB real-space entry is considered as containing a page-frame real address and the real-space token origin and region, segment, and page indexes used to form the entry.

Any applicable TLB region-table entries, the TLB segment-table entry, and the TLB page-table entry may be merged into a single entry called a TLB composite table entry. In a similar manner, an implementation may combine any contiguous subset of table levels. When this happens, the intermediate table origins, offsets, and lengths need not be buffered.

An equivalent to the TLB combined region-and-segment-table entry (CRSTE), described in previous versions of the architecture, may be formed which maps a table origin, region index, segment index, and common-segment bit to a segment-frame absolute address or page-table origin (and other designated fields).

The token origin in a TLB real-space entry is indistinguishable from the table origin in a TLB composite-, region-, or segment-table entry.

Note:

The following sections describe the conditions under which information may be placed in the TLB, the conditions under which information from the TLB may be used for address translation, and how changes to the translation tables affect the translation process.

Formation of TLB Entries

The formation of TLB region-table entries, TLB segment-table entries and TLB page-table entries from table entries in real or absolute storage, and the effect of any manipulation of the contents of table entries in storage by the program, depend on whether the entries in storage are attached to a particular CPU and on whether the entries are valid.

The attached state of a table entry denotes that the CPU to which it is attached can attempt to use the table entry for implicit address translation, except that a table entry for the primary or home address space may be attached even when the CPU does not fetch from either of those spaces. A table entry may be attached to more than one CPU at a time.

The valid state of a table entry denotes that the region set, region, segment, or page associated with the table entry is available. An entry is valid when the region-invalid, segment-invalid, or page-invalid bit in the entry is zero.

A region-table entry, segment-table entry, or page-table entry may be placed in the TLB whenever the entry is attached and valid and would not cause a translation-specification exception if used for translation.

The region-table entries, if any, and the segment-table entry, if any, used to translate a virtual address are called a translation path. The highest-level table entry in a translation path is attached when it is within a table designated by an attaching address-space-control element (ASCE). "Within a table" means as determined by the origin and length fields in the ASCE. An ASCE is an attaching ASCE when all of the following conditions are met:

1. The current PSW specifies DAT on.
2. The current PSW contains no errors that would cause an early specification exception to be recognized.
3. The ASCE meets the requirements in a, b, c, or d, below.
   a. The ASCE is the primary ASCE in control register 1.
   b. The ASCE is the secondary ASCE in control register 7, and any of the following requirements is met:
      The CPU is in the secondary-space mode or access-register mode.
      The CPU is in the primary-space mode, and the secondary-space control, bit 37 of control register 0, is one.
      The $M_4$ operand of LOAD PAGE TABLE ENTRY ADDRESS explicitly allows access to the secondary space or explicitly allows access-register translation.
      Either operand's operand-access control (OAC) of MOVE WITH OPTIONAL SPECIFICATIONS explicitly allows access to the secondary space or explicitly allows access-register translation.
      For further explanation of the term "explicitly allows," used in the above two items, see the programming note, below.
   c. The ASCE is in either an attached and valid ASN-second-table entry (ASTE) or a usable ALB ASTE, and any of the following requirements is met:

The CPU is in the access-register mode.
   The $M_4$ field of LOAD PAGE TABLE ENTRY ADDRESS explicitly allows access-register translation to be performed.
   Either operand's OAC of MOVE WITH OPTIONAL SPECIFICATIONS explicitly allows access-register translation to be performed.
   d. The ASCE is the home ASCE in control register 13.

Regardless of whether DAT is on or off, an ASCE is also an attaching ASCE when the current PSW contains no errors that would cause an early specification exception to be recognized, and any of the following condition is met:
   The home ASCE is considered to be an attaching ASCE when a monitor-event counting operation occurs.
   Each of the remaining table entries in a translation path is attached when it is within the table designated either by an attached and valid entry of the next higher level which would not cause a translation-specification exception if used for translation or by a usable TLB entry of the next higher level. "Within the table" means as determined by the origin, offset, and length fields in the next-higher-level entry. A usable TLB entry is explained in the next section.
   A page-table entry is attached when it is within the page table designated by either an attached and valid segment-table entry that would not cause a translation-specification exception if used for translation or a usable TLB segment-table entry.
   A region-table entry or segment-table entry causes a translation-specification exception if the table-type bits, bits 60 and 61, in the entry are inconsistent with the level at which the entry would be encountered when using the translation path in the translation process. A segment-table entry also causes a translation-specification exception if the private-space-control bit is one in the address-space-control element used to select it and the common-segment bit is one in the entry. When EDAT-2 applies, a region-third-table entry also causes a translation-specification exception if the private-space-control bit is one in the address-space-control element used to select it and the common-region bit is one in the entry. A page-table entry causes a translation-specification exception if bit 52 in the entry is one. When EDAT-1 does not apply, a page-table entry also causes a translation-specification exception if bit 55 in the entry is one.

A TLB real-space use an early specification exception to be recognized, and any of the following conditions is met:
   The home ASCE is considered to be an attaching ASCE when a monitor-event counting operation occurs.
   Each of the remaining table entries in a translation path is attached when it is within the table designated either by an attached and valid entry of the next higher level which would not cause a translation-specification exception if used for translation or by a usable TLB entry of the next higher level. "Within the table" means as determined by the origin, offset, and length fields in the next-higher-level entry. A usable TLB entry is explained in the next section.
   A page-table entry is attached when it is within the page table designated by either an attached and valid segment-table entry that would not cause a translation-specification exception if used for translation or a usable TLB segment-table entry.
   A region-table entry or segment-table entry causes a translation-specification exception if the table-type bits, bits 60 and 61, in the entry are inconsistent with the level at which the entry would be encountered when using the translation path in the translation process. A segment-table entry also causes a translation-specification exception if the private-space-control bit is one in the address-space-control element used to select it and the common-segment bit is one in the entry. When EDAT-2 applies, a region-third-table entry also causes a translation-specification exception if the private-space-control bit is one in the address-space-control element used to select it and the common-region bit is one in the entry. A page-table entry causes a translation-specification exception if bit 52 in the entry is one. When EDAT-1 does not apply, a page-table entry also causes a translation-specification exception if bit 55 in the entry is one.

Subject to the attached and valid constraints defined above, the CPU may form TLB entries in anticipation of future storage references or as a result of the speculative execution of instructions.

Programming Note:
   In the above list of conditions for an ASCE to be attaching, item 3.b and 3.c use the term "explicitly allows . . . ", as explained below:
      LPTEA explicitly allows access to the secondary space when the $M_4$ field is 0010 binary.
      LPTEA explicitly allows ART to be performed when the $M_4$ field is 0001 binary.
      Either operand of MVCOS explicitly allows access to the secondary space when bits 8-9 of the operand's OAC are 10 binary, bit 15 of the OAC is one, and the secondary-space control, bit 37 of control register 0, is one.
      Either operand of MVCOS explicitly allows ART to be performed when bits 8-9 of the operand's OAC are 01 binary, and bit 15 of the OAC is one.

Use of TLB Entries

The usable state of a TLB entry denotes that the CPU can attempt to use the TLB entry for implicit address translation. A usable TLB entry attaches the next-lower-level table, if any, and may be usable for a particular instance of implicit address translation.

With reference to a TLB entry, the term "current level" refers to the level of translation table (region first table, region second table, region third table, segment table, or page table) from which the TLB entry was formed. Likewise, the "current-level index" is that portion of the virtual address used as an index into the current level of translation table.

A TLB region- or segment-table entry is in the usable state when all of the following conditions are met:
  1. The current PSW specifies DAT on.
  2. The current PSW contains no errors that would cause an early specification exception to be recognized.
  3. The TLB entry meets at least one of the following requirements:
     a. The common-region bit is one in a TLB region-third-table entry.
     b. The common-segment bit is one in a TLB segment-table entry.
     c. The ASCE-table-origin (ASCETO) field in the TLB entry matches the table- or token-origin field in an attaching address-space-control element.
     d. The TLB entry is a TLB region-second-table, region-third-table, or segment-table entry, and the current-level table-origin field in the TLB entry matches one of the following:
        The table-origin field in an attaching ASCE which directly designates the current table level (as indicated by the R and DT bits)
        The table-origin field in an attached region-table entry of the next higher level
        The table-origin field of the same level in a usable TLB region-table entry of the next higher level A TLB region-table entry may be used for a particular instance of implicit address translation only when the entry is in the usable state, the current-level index field in the TLB entry matches the corresponding index field of the virtual address being translated, and any of the following conditions is met:
1. The ASCE-table-origin (ASCETO) field in the TLB entry matches the table- or token-origin field in the address-space-control element being used in the translation, and the portion of the virtual address being translated which is to the left of the current-level index matches the corresponding index fields in the TLB entry.
2. The address-space-control element being used in the translation designates a table of the current level, and the current-level table-origin field in the TLB entry matches the table origin in that address-space-control element.
3. The current-level table-origin field in the TLB entry matches the table origin of the same level in the next-higher-level table entry or TLB entry being used in the translation.
4. For a TLB region-third-table entry, the common-region bit is one in the TLB entry, and the region-first-index and region-second-index fields in the TLB entry matches those of the virtual address being translated.

However, when EDAT-2 applies, the TLB region-third-table entry is not used if the common-region bit is one in the entry and either the private-space-control bit is one in the address-space-control element being used in the translation or that address-space-control element is a real-space designation. In both these cases, the TLB entry is not used even if the ASCE-table-origin (ASCETO) field in the entry and the table- or token-origin field in the address-space-control element match.

A TLB segment-table entry may be used for a particular instance of implicit address translation only when the entry is in the usable state, the segment-index field in the TLB entry matches that of the virtual address being translated, and any of the following conditions is met:
1. The ASCE-table-origin (ASCETO) field in the TLB entry matches the table- or token-origin field in the address-space-control element being used in the translation, and the region-index field in the TLB entry matches that of the virtual address being translated.
2. The segment-table-origin field in the TLB entry matches the table-origin field in the address-space-control element being used in the translation, and that address-space-control element is a segment-table designation.
3. The segment-table-origin field in the TLB entry matches the segment-table-origin field in the region-third-table entry or TLB region-third-table entry being used in the translation.
4. The common-segment bit is one in the TLB entry, and the region-index field in the TLB entry matches that of the virtual address being translated.

However, the TLB segment-table entry is not used if the common-segment bit is one in the entry and either the private-space-control bit is one in the address-space-control element being used in the translation or that address-space-control element is a real-space designation. In both these cases, the TLB entry is not used even if the ASCE-table-origin (ASCETO) field in the entry and the table- or token-origin field in the address-space-control element match.

A TLB page-table entry may be used for a particular instance of implicit address translation only when the page-table-origin field in the entry matches the page-table-origin field in the segment-table entry or TLB segment-table entry being used in the translation and the page-index field in the TLB page-table entry matches the page index of the virtual address being translated.

A TLB real-space entry may be used for implicit address translation only when the token-origin field in the TLB entry matches the table- or token-origin field in the address-space-control element being used in the translation and the region-index, segment-index, and page-index fields in the TLB entry match those of the virtual address being translated The operand addresses of LOAD PAGE-TABLE-ENTRY ADDRESS, LOAD REAL ADDRESS, and STORE REAL ADDRESS, and accesses to the enhanced-monitor counting array may be translated with the use of the TLB contents whether DAT is on or off. However, for LOAD PAGE-TABLE-ENTRY ADDRESS, LOAD REAL ADDRESS, and STORE REAL ADDRESS, TLB entries still are formed only if DAT is on.

Programming Notes:
1. Although contents of a table entry may be copied into the TLB only when the table entry is both attached and valid, the copy may remain in the TLB even when the table entry itself is no longer attached or valid.
2. Except when translations are performed as a result of enhanced-monitor counting operations, no contents can be copied into the TLB when DAT is off because the table entries at this time are not attached. In particular, translation of the operand address of LOAD PAGE-TABLE-ENTRY ADDRESS, LOAD REAL ADDRESS and STORE REAL ADDRESS with DAT off does not cause entries to be placed in the TLB.
   Conversely, when DAT is on, information may be copied into the TLB from all translation-table entries that could be used for address translation, given the current translation parameters, the setting of the address-space-control bits, and the contents of the access registers. The loading of the TLB does not depend on whether the entry is used for translation as part of the execution of the current instruction, and such loading can occur when the CPU is in the wait state.
3. More than one copy of contents of a table entry may exist in the TLB. For example, some implementations may cause a copy of contents of a valid table entry to be placed in the TLB for the table origin in each address-space-control element by which the entry becomes attached.

Modification of Translation Tables

When an attached and invalid table entry is made valid and no entry usable for translation of the associated virtual address is in the TLB, the change takes effect no later than the end of the current unit of operation. Similarly, when an unattached and valid table entry is made attached and no usable entry for the associated virtual address is in the TLB, the change takes effect no later than the end of the current unit of operation.

When a valid and attached table entry is changed, and when, before the TLB is cleared of entries that qualify for substitution for that entry, an attempt is made to refer to storage by using a virtual address requiring that entry for translation, unpredictable results may occur, to the following extent. The use of the new value may begin between instructions or during the execution of an instruction, including the instruction that caused the change. Moreover, until the TLB is cleared of entries that qualify for substitution for that entry, the TLB may contain both the old and the new values, and it is unpredictable whether the old or new value is selected for a particular access. If both old and new values of a higher-level table entry are present in the TLB, a lower-level table entry may be fetched by using one value and placed in the TLB associated with the other value. If the new value of the entry is a value that would cause an exception, the exception may or may not cause an interruption to occur. If an interruption does occur, the result fields of the instruction may be changed even though the exception would normally cause suppression or nullification.

Entries are cleared from the TLB in accordance with the following rules:
1. All entries are cleared from the TLB by the execution of PURGE TLB or SET PREFIX and by CPU reset.
2. All entries may be cleared from all TLBs in the configuration by the execution of COMPARE AND SWAP AND PURGE by any of the CPUs in the configuration, depending on a bit in a general register used by the instruction.
3. Selected entries are cleared from all TLBs in the configuration by the execution of INVALIDATE DAT TABLE ENTRY or INVALIDATE PAGE TABLE ENTRY by any of the CPUs in the configuration.
4. Some or all TLB entries may be cleared at times other than those required by the preceding rules.

Programming Notes:
1. Entries in the TLB may continue to be used for translation after the table entries from which they have been formed have become unattached or invalid. These TLB entries are not necessarily removed unless explicitly cleared from the TLB.
    A change made to an attached and valid entry or a change made to a table entry that causes the entry to become attached and valid is reflected in the translation process for the next instruction, or earlier than the next instruction, unless a TLB entry qualifies for substitution for that table entry. However, a change made to a table entry that causes the entry to become unattached or invalid is not necessarily reflected in the translation process until the TLB is cleared of entries that qualify for substitution for that table entry.
2. Exceptions associated with dynamic address translation may be established by a pretest for operand accessibility that is performed as part of the initiation of instruction execution. Consequently, a region-first-translation, region-second-translation, region-third-translation, segment-translation, or page-translation exception may be indicated when a table entry is invalid at the start of execution even if the instruction would have validated the table entry it uses and the table entry would have appeared valid if the instruction was considered to process the operands one byte at a time.
3. A change made to an attached table entry, except to set the I bit to zero, to set the CO bit of a segment- or page-table entry to one, or to alter the rightmost byte of a page-table entry, may produce unpredictable results if that entry is used for translation before the TLB is cleared of all copies of contents of that entry. The use of the new value may begin between instructions or during the execution of an instruction, including the instruction that caused the change. When an instruction, such as MOVE (MVC), makes a change to an attached table entry, including a change that makes the entry invalid, and subsequently uses the entry for translation, a changed entry is being used without a prior clearing of the entry from the TLB, and the associated unpredictability of result values and of exception recognition applies.
    Manipulation of attached table entries may cause spurious table-entry values to be recorded in a TLB. For example, if changes are made piecemeal, modification of a valid attached entry may cause a partially updated entry to be recorded, or, if an intermediate value is introduced in the process of the change, a supposedly invalid entry may temporarily appear valid and may be recorded in the TLB. Such an intermediate value may be introduced if the change is made by an I/O operation that is retried, or if an intermediate value is introduced during the execution of a single instruction.
    As another example, if a segment-table entry is changed to designate a different page table and used without clearing the TLB, the new page-table entries may be fetched and associated with the old page-table origin. In such a case, execution of INVALIDATE PAGE TABLE ENTRY designating the new page-table origin will not necessarily clear the page-table entries fetched from the new page table.
4. To facilitate the manipulation of page tables, the INVALIDATE PAGE TABLE ENTRY instruction is provided. This instruction sets the I bit in a page-table entry to one and clears one or more TLBs in the configuration of entries formed from those table entries as follows:
    a. All TLBs in the configuration are cleared when the local-TLB-clearing facility is not installed, or when the facility is installed and the instruction specifies the clearing of all TLBs (that is, the local-clearing control in the instruction is zero).
    b. Only the TLB in the CPU executing the INVALIDATE PAGE TABLE ENTRY instruction is cleared when the local-TLB-clearing facility is installed and the instruction specifies the clearing of only the local TLB (that is, the local-clearing control in the instruction is one).

The following aspects of the TLB operation should be considered when using INVALIDATE PAGE TABLE ENTRY. (See also the programming notes for INVALIDATE PAGE TABLE ENTRY.)
    a. INVALIDATE PAGE TABLE ENTRY should be executed before making any change to a page-table entry other than changing the rightmost byte; otherwise, the selective-clearing portion of INVALIDATE PAGE TABLE ENTRY may not clear the TLB copies of the entry.
    b. Invalidation of all the page-table entries within a page table by means of INVALIDATE PAGE TABLE ENTRY does not necessarily clear the TLB of any segment-table entry designating the page table. When it is desired to invalidate and clear the TLB of a region- or segment-table entry, the rules in note 5 below must be followed.
    Similarly, invalidation of all the lower-level table entries within a region or segment table by means of INVALIDATE DAT TABLE ENTRY does not necessarily clear the TLB of any higher-level table entry designating the lower-level table. When it is desired to invalidate and clear the TLB of a higher-level table entry, the rules in note 5 below must be followed.
    c. When a large number of page-table entries are to be invalidated at a single time, the overhead involved in using COMPARE AND SWAP AND PURGE (one that purges the TLB), INVALIDATE DAT TABLE ENTRY, or PURGE TLB and in following the rules in note 5 below may be less than in issuing INVALIDATE PAGE TABLE ENTRY for each page-table entry.
5. Manipulation of table entries should be in accordance with the following rules. If these rules are complied with, translation is performed as if the table entries from real or absolute storage were always used in the translation process.

a. A valid table entry must not be changed while it is attached to any CPU and may be used for translation by that CPU except to (1) invalidate the entry by using INVALIDATE PAGE TABLE ENTRY or INVALIDATE DAT TABLE ENTRY, (2) alter bits 56-63 of a page-table entry, (3) make a change by means of a COMPARE AND SWAP AND PURGE instruction that purges the TLB, or (4) replace an entry by using COMPARE AND REPLACE DAT TABLE ENTRY.
   b. When any change is made to an attached and valid or unattached table entry other than a change to bits 56-63 of a page-table entry, each CPU which may have a TLB entry formed from that entry must be caused to purge its TLB after the change occurs and prior to the use of that entry for implicit translation by that CPU. (Note that a separate purge is unnecessary if the change was made by using COMPARE AND REPLACE DAT TABLE ENTRY, INVALIDATE DAT TABLE ENTRY, INVALIDATE PAGE TABLE ENTRY, or a COMPARE AND SWAP AND PURGE instruction that purges the TLB.) In the case when the table entry is attached and valid, this rule applies when it is known that a program is not being executed that may require the entry for translation.
   c. When any change is made to an invalid table entry in such a way as to allow intermediate valid values to appear in the entry, each CPU to which the entry is attached must be caused to purge its TLB after the change occurs and prior to the use of the entry for implicit address translation by that CPU.
   d. When any change is made to an offset or length specified for a table, each CPU which may have a TLB entry formed from a table entry that no longer lies within its table must be caused to purge its TLB after the change occurs and prior to the use of the table for implicit translation by that CPU.

Note that when an invalid page-table entry is made valid without introducing intermediate valid values, the TLB need not be cleared in a CPU which does not have any TLB entries formed from that entry. Similarly, when an invalid region-table or segment-table entry is made valid without introducing intermediate valid values, the TLB need not be cleared in a CPU which does not have any TLB entries formed from that validated entry and which does not have any TLB entries formed from entries in a page table attached by means of that validated entry.

The execution of PURGE TLB, COMPARE AND SWAP AND PURGE, or SET PREFIX may have an adverse effect on the performance of some models. Use of these instructions should, therefore, be minimized in conformance with the above rules.

6. The following considerations are in effect when EDAT-1 applies:
      a. When the STE-format and ACCF-validity controls are both one, it is unpredictable whether the CPU inspects the access-control bits and the fetch-protection bit in the segment-table entry or in the storage key of the corresponding 4K-byte block for any given key-controlled-protection check. Therefore, the program should ensure that the access-control bits and fetch-protection bit in the segment-table entry are identical to the respective fields in all 256 storage keys for the constituent 4K-byte blocks of the segment, before setting the invalid bit in the STE to zero.

Prior to changing the ACCF-validity control, the access-control bits, or the fetch protection bit in the segment-table entry, and prior to changing the access-control bits or fetch-protection bit in any of the segment's 256 storage keys, the program should first set the invalid bit to one in the segment-table entry and clear all entries in all TLBs in the configuration, as described previously in this section.
      b. Prior to setting the change-recording override to zero in a segment-table entry, the program should set the invalid bit to one in the segment-table entry, and clear all entries in all TLBs in the configuration (for example, by using INVALIDATE DAT TABLE ENTRY). Invalidating the table entry is not required if the change is made using COMPARE AND REPLACE DAT TABLE ENTRY or a form of COMPARE AND SWAP AND PURGE that clears the TLB.
      c. Prior to setting the change-recording override to zero in page-table entry, the program should set the invalid bit to one in the page-table entry, and clear all entries in all TLBs in the configuration (for example, by using INVALIDATE PAGE TABLE ENTRY). Invalidating the table entry is not required if the change is made using COMPARE AND REPLACE DAT TABLE ENTRY or a form of COMPARE AND SWAP AND PURGE that clears the TLB.

When EDAT-2 applies, the following additional considerations are in effect:
      a. When the RTTE-format control and ACCF-validity control are both one, it is unpredictable whether the CPU inspects the access-control bits and the fetch-protection bit in the region-third-table entry or in the storage key of the corresponding 4K-byte block for any given key-controlled-protection check. Therefore, the program should ensure that the access-control bits and fetch-protection bit in the region-third-table entry are identical to the respective fields in all 524,288 storage keys for the constituent 4K-byte blocks of the region, before setting the invalid bit in the RTTE to zero.

Prior to changing the ACCF-validity control, the access-control bits, or the fetch protection bit in the region-third-table entry, and prior to changing the access-control bits or fetch-protection bit in any of the region's 524,288 storage keys, the program should first set the invalid bit to one in the region-third-table entry and clear all entries in all TLBs in the configuration, as described previously in this section.
      b. Prior to setting the change-recording override to zero in a region-third-table entry, the program should set the invalid bit to one in the region-third-table entry, and clear all entries in all TLBs in the configuration (for example, by using INVALIDATE DAT TABLE ENTRY). Invalidating the table entry is not required if the change is made using COMPARE AND REPLACE DAT TABLE ENTRY or a form of COMPARE AND SWAP AND PURGE that clears the TLB.

Failure to observe these procedures may lead to unpredictable results, possibly including a delayed-access-exception machine-check or failure to record a change.

Enhanced-DAT Facility 1

The enhanced-DAT facility 1 may be available on models implementing z/Architecture. When the facility is installed and enabled, DAT translation may produce either a page-frame real address or a segment frame absolute address, determined by the STE-format control in the segment-table entry. When the facility is installed in a configuration, a new bit in control register 0 enables the facility. Note: The term EDAT-1 applies is used pervasively in this document to describe the condition of when the enhanced-DAT facility 1 is installed in the configuration and enabled by control register 0.

When EDAT-1 applies, the following additional function is available in the DAT process:

A DAT-protection bit is added to region-table entries, providing function similar to the DAT-protection bits in the segment- and page-table entries.

A STE-format control is added to the segment table entry. When the STE-format control is zero, DAT proceeds as is currently defined, except that a change-recording override in the page-table entry indicates whether setting of the change bit may be bypassed for the page.

When the STE-format control is one, the segment-table entry also contains the following:

A segment-frame absolute address (rather than a page-table origin) specifying the absolute storage location of the 1 M-byte block.

Access-control bits and a fetch-protection bit which optionally may be used in lieu of the corresponding bits in the segment's individual storage keys A bit which determines the validity of the access-control bits and a fetch-protection bit in the segment-table entry A change-recording override which indicates whether setting of the change bit may be bypassed in the segment's individual storage keys. The facility adds the PERFORM FRAME MANAGEMENT FUNCTION control instruction. The facility includes enhancements or changes to the following control instructions: • LOAD PAGE-TABLE-ENTRY ADDRESS • MOVE PAGE • SET STORAGE KEY EXTENDED • TEST PROTECTION Enhanced-DAT Facility 2

The enhanced-DAT facility 2 may be available on models implementing z/Architecture. When the facility is installed and enabled, DAT translation may produce either a page-frame real address, a segment frame absolute address, or a region-frame absolute address, determined by format controls in the region third-table entry (if any) and the segment-table entry (if any).

Note:

The term EDAT-2 applies is used pervasively in this document to describe the condition of when the enhanced-DAT facility 2 is installed in the configuration and enabled by control register 0.

When EDAT-2 applies, the following additional function is available in the DAT process:

EDAT-1 applies.

A format control is added to the region-third-table entry (RTTE). When the RTTE-format control is zero, DAT proceeds as is the case for when EDAT-1 applies.

When the RTTE-format control is one, the region-third-table entry also contains the following:

A region-frame absolute address (rather than a segment-table origin) specifying the absolute storage location of the 2 G-byte block.

Access-control bits and a fetch-protection bit which optionally may be used in lieu of the corresponding bits in the region's individual storage keys A bit which determines the validity of the access-control bits and a fetch-protection bit in the region-third-table entry—A change-recording override which indicates whether setting of the change bit may be bypassed in the region's individual storage keys. The enhanced-DAT facility 2 adds the COMPARE AND REPLACE DAT TABLE entry instruction, providing for the dynamic replacement of valid, attached DAT-table entries, and the selective clearing of any TLB entries created from the replaced entry. The enhanced-DAT facility 2 also includes enhancements or changes to the following control instructions: • INVALIDATE DAT TABLE ENTRY • LOAD PAGE-TABLE-ENTRY ADDRESS • MOVE PAGE • PERFORM FRAME MANAGEMENT FUNCTION • TEST PROTECTION When the enhanced-DAT facility 2 is installed, the enhanced-DAT facility 1 is also installed.

INVALIDATE DAT TABLE ENTRY (IDTE) performs the invalidation-and-clearing operation by selectively clearing TLB combined region and segment table entries when a segment-table entry or entries are invalidated. IDTE also performs the clearing-by-ASCE operation.

During execution of an IDTE instruction, a specified portion of storage (e.g., virtual storage) is invalidated. As examples, a segment of storage, which includes a plurality of pages of storage, or a region of storage, which includes a plurality of segments of storage, is selected to be invalidated. The invalidation is facilitated by the setting of invalidation indicators located in data structure entries corresponding to the units of storage to be invalidated. In a further aspect, buffer entries (e.g., Translation Lookaside Buffer entries) associated with the storage being invalidated, or other storage, are cleared. Yet further, in another aspect, buffer entries associated with selected address spaces are cleared from buffers without affecting buffer entries of non-selected address spaces, and without performing invalidation. In one example, an instruction, referred to herein as an Invalidate Dynamic Address Translation (DAT) Table Entry (IDTE) instruction, from the IBM® z/Architecture is used to perform one or more of the above operations.

Invalidate DAT Table Entry

IDTE $R_1$, $R_3$, $R_2[,M_4]$

Note:

The term "specified CPU or CPUs" has the following meaning for scope of TLBs affected by this instruction:

When the local-TLB-clearing facility is not installed, or when the facility is installed and the local-clearing-control (LC) bit in the $M_4$ field is zero, the term "specified CPU or CPUs" means all of the CPUs in the configuration.

When the local-TLB-clearing facility is installed and the LC bit in the $M_4$ field is one, the term "specified CPU or CPUs" means only the CPU executing the IDTE instruction (the local CPU). The TLBs in all other CPUs in the configuration may not be affected.

When the clearing-by-ASCE-option bit, bit 52 of general register $R_2$, is zero, an operation called the invalidation-and-clearing operation is performed, as follows. The designated region-table entry or segment-table entry in storage, or a range of entries beginning with the designated entry, is invalidated, and the translation-lookaside buffers (TLBs) in the specified CPU or CPUs in the configuration are cleared of (1) all TLB table entries of the designated type formed through the use of the invalidated entry or entries in storage, and (2) all lower-level TLB table entries formed through the use of the cleared higher-level TLB table entries. The TLB entries cleared may optionally be limited to entries formed to translate addresses in a specified address space.

When the clearing-by-ASCE-option bit is one, an operation called the clearing-by-ASCE operation is performed, as follows. The operation does not perform any invalidation of DAT-table entries in storage, but it does clear, from the TLBs in all CPUs in the configuration, all region-first-table entries, region-second-table entries, region-third-table entries, segment-table entries and page-table entries formed to translate addresses in a specified address space.

The bits of the $M_4$ field are defined as follows:

Reserved: Bits 0-1 of the $M_4$ field are ignored but should contain zeros; otherwise, the program may not operate compatibly in the future.

Format-Control Summary (FS): When EDAT-2 applies, bit 2 of the $M_4$ field is the format-control summary (FS) for the invalidation-and-clearing operation. Bit 2 of the $M_4$ field is ignored for the clearing-by-ASCE operation and when EDAT-2 does not apply.

The format-control summary applies when the designation type (DT), bits 60-61 of the general register $R_1$, is 00 or 01 binary; when the DT in general register $R_1$ is 10 or 11 binary, the format-control summary is ignored.

Local-Clearing Control (LC): When the local-TLB-clearing facility is installed, the LC bit, bit 3 of the $M_4$ field, controls whether only the TLB in the local CPU is cleared or whether the TLBs in all CPUs of the configuration are cleared. When the local-TLB-clearing facility is not installed, bit 3 of the $M_4$ field is ignored.

Invalidation-and-Clearing Operation

When bit 52 of general register $R_2$, the clearing-by-ASCE-option bit, is zero, the invalidation-and-clearing operation is specified.

The contents of general register $R_1$ have the format of an address-space-control element with only the table origin, bits 0-51, and designation-type control (DT), bits 60 and 61, used. The table origin designates the DAT table in which one or more entries are to be invalidated, and DT specifies the type of that table.

Bits 52-59, 62, and 63 of general register $R_1$ are ignored.

Bits 0-43 of general register $R_2$ have the format of the region index and segment index of a virtual address. The part of bits 0-43 normally used by DAT to select an entry in the type of table designated by general register $R_1$ is called the effective invalidation index.

Bits 60 and 61 of general register $R_1$ specify a table type and an effective invalidation index as follows:

The part of bits 0-43 of general register $R_2$ to the right of the effective invalidation index is ignored.

The table origin in general register $R_1$ and the effective invalidation index designate a DAT-table entry to be invalidated. Bits 53-63 of general register $R_2$ are an unsigned binary integer specifying the number of additional table entries to be invalidated. Therefore, the number of entries to be invalidated is 1-2,048, corresponding to a value of bits 53-63.

Bits 44-51 of general register $R_2$ must be zeros; otherwise, a specification exception is recognized.

If $R_3$ is nonzero, the contents of general register $R_3$ have the format of an address-space-control element with only the table origin, bits 0-51, and designation-type control (DT), bits 60 and 61, used. These contents are used to select TLB entries to be cleared. Bits 52-59, 62, and 63 of general register $R_3$ are ignored. If $R_3$ is zero, the entire contents of general register 0 are ignored, and TLB entries are cleared regardless of the ASCE used to form them.

The table origin in general register $R_1$ and effective invalidation index in general register $R_2$ designate a table entry in accordance with the rules in "Lookup in a Table Designated by an Address-Space-Control Element" in the "z/Architecture Principles of Operation," IBM Publication No. SA22-7832-08, August 2010, which is hereby incorporated herein by reference in its entirety, except that a carry from bit position 0 of the resulting address is always ignored, and the index is not checked against a table-length field. The table origin is treated as a 64-bit address, and the addition is performed by using the rules for 64-bit address arithmetic, regardless of the current addressing mode specified by bits 31 and 32 of the current PSW. The address formed from these two components is a real or absolute address. The invalid bit, bit 58, of this region-table or segment-table entry is set to one. During this procedure, the entry is not checked for a format error or for whether the origin, in the entry, of the next-lower-level table would cause an addressing exception. The table-type field in the entry is ignored. If the entry is a segment-table entry, the common-segment bit in the entry is ignored. If EDAT-2 applies and the entry is a region-third-table entry, the common-region bit in the entry is ignored.

The entire table entry is fetched concurrently from storage. Subsequently, the byte containing the invalid bit is stored. The fetch access to the entry is subject to key-controlled protection, and the store access is subject to key-controlled protection and low-address protection.

If bits 53-63 of general register $R_2$ are not all zeros, the setting of the invalid bit to one in a region-table or segment-table entry is repeated by adding one to the previously used value of the effective invalidation index, and this is done as many times as are specified by bits 53-63. A carry out of the leftmost bit position of the effective invalidation index is ignored, and wraparound in the table occurs in this case. The contents of general register $R_2$ remain unchanged.

A serialization function is performed before the operation begins and again after the operation is completed. As is the case for all serialization operations, this serialization applies only to this CPU; other CPUs are not necessarily serialized.

After it has set an invalid bit to one, this CPU clears selected entries from its TLB. Then if the local-TLB-clearing facility is not installed, or if the facility is installed and LC bit in the $M_4$ field is zero, this CPU signals all other CPUs in the configuration to clear selected entries from their TLBs. Each affected TLB is cleared of at least those entries for which all of the following conditions are met:

The effective invalidation index in general register $R_2$ matches the corresponding index in the TLB table entry of type designated by the DT field in bits 60-61 of general register $R_1$. If the model implements a composite TLB entry that includes the index designated by the DT field, bits to the left of the effective index in general register $R_2$ also match any corresponding bits provided in the designated TLB table entry. Note that when multiple table entries are invalidated due to bits 53-63 of general register $R_2$, then the effective invalidation index is incremented, a carry out of the leftmost bit position of the index is lost, and TLB region- or segment-table entries are cleared for each value of the index so obtained.

Either the $R_3$ field is zero, or the table-origin and designation-type fields in general register $R_3$ match the table-origin and designation-type fields in the address-space-control element (ASCE) used to form the TLB table entry.

If the $R_3$ field is zero, then the condition described in this step does not apply.

If the entry invalidated in storage designates a lower-level translation table, the lower-level table origin in the invalidated entry matches the table-origin field in the TLB table entry.

Each affected TLB is also cleared of at least any lower-level TLB table entries for which all of the following conditions are met:

The lower-level TLB table entry was formed through use of an entry invalidated in storage or through use of a higher-level TLB table entry formed through use of either an entry invalidated in storage or a TLB entry cleared in this process.

Either the $R_3$ field is zero or the table-origin and designation-type fields in general register $R_3$ match the table-origin and designation-type fields in the address-space-control element (ASCE) used to form the lower-level TLB table entry. This ASCE may be one that attached a translation path containing a higher-level table entry that attached the lower-level table entry in storage from which the lower-level TLB table entry was formed, or it may be one that made usable a higher-level TLB table entry that attached the lower-level table entry in storage from which the lower-level TLB table entry was formed. If the $R_3$ field is zero, then the condition described in this step does not apply.

If the entry invalidated in storage designates a lower-level translation table, the lower-level table origin in the invalidated entry matches the table-origin field in the TLB table entry.

Programming Notes:
1. Setting the format-control summary to one may provide improved performance on certain models.
2. When the designation type (DT), bits 60-61 of general register $R_1$, is 00 binary, the format-control summary applies to the segment-table entries being invalidated. When the DT in general register $R_1$ is 01 binary, the format-control summary applies to the region-third-table entries being invalidated.
3. The program should only set the format-control summary to one if it can ensure that format control (bit 53 of the table entry) is one in all of the table entries being invalidated. If the format-control summary is set to one, but the format control is not one in all of the table entries being invalidated, incomplete purging of the TLB may occur, resulting in unpredictable results from DAT.
4. The $M_4$ field of the instruction is considered to be optional, as indicated by the field being contained within brackets [ ] in the assembler syntax. When the $M_4$ field is not specified, the assembler places zeros in that field of the instruction.

Storing in the region- or segment-table entry and the clearing of TLB entries may or may not occur if the invalid bit is already one in the region- or segment-table entry.

When multiple entries are invalidated, clearing of TLB entries may be delayed until all entries have been invalidated.

Clearing-by-ASCE Operation

When bit 52 of general register $R_2$, the clearing-by-ASCE-option bit, is one, the clearing-by-ASCE operation is specified.

The contents of general register $R_3$ have the format of an address-space-control element with only the table origin, bits 0-51, and designation-type control (DT), bits 60 and 61, used. These contents are used to select TLB entries to be cleared. Bits 52-59, 62, and 63 of general register $R_3$ are ignored. $R_3$ may be zero or nonzero, that is, any general register, including register 0, may be designated.

Bits 44-51 of general register $R_2$ must be zeros; otherwise, a specification exception is recognized.

The contents of general register $R_1$ and of bit positions 0-43 and 53-63 of general register $R_2$ are ignored.

The TLBs of the specified CPU or CPUs in the configuration are cleared at all levels of at least those entries for which the table-origin and designation-type fields in general register $R_3$ match the table-origin and designation-type fields in the address-space-control element (ASCE) used to form the entry. This ASCE is the one used in the translation during which the entry was formed.

When the clearing-by-ASCE-option bit (bit 52 of general register $R_2$ is one), the $M_4$ field is ignored.

Common Operation

The execution of INVALIDATE DAT TABLE ENTRY is not completed on the CPU which executes it until the following occur:
1. All entries meeting the criteria specified above have been cleared from the TLB of this CPU. When the local-TLB-clearing facility is installed and the LC bit in the $M_4$ field is one, execution of INVALIDATE DAT TABLE ENTRY is complete at this point and the following step is not performed.
2. When the local-TLB-clearing facility is not installed, or when the facility is installed and the LC bit in the $M_4$ field is zero, all other CPUs in the configuration have completed any storage accesses, including the updating of the change and reference bits, by using TLB entries corresponding to the specified parameters.

The operations do not necessarily have any effect on TLB real-space entries.

Special Conditions:

Bits 44-51 of general register $R_2$ must be zeros; otherwise, a specification exception is recognized.

The operation is suppressed on all addressing and protection exceptions (invalidation-and-clearing operation only).

Resulting Condition Code:
The code is unpredictable.

Program Exceptions:
Addressing (invalidated region- or segment-table entry, invalidation-and-clearing operation only).
Operation (if the DAT-enhancement facility is not installed)
Privileged operation
Protection (fetch and store, region- or segment-table entry, key-controlled protection and low-address protection; invalidation-and-clearing operation only).
Specification Programming Notes:
1. The selective clearing of TLB entries may be implemented in different ways, depending on the model, and, in general, more entries may be cleared than the minimum number required. When the invalidation-and-clearing operation is performed, some models may clear all TLB entries when the effective invalidation index is not a segment index or may clear an entry regardless of the page-table origin in the entry. When that operation or the clearing-by-ASCE operation is performed, some models may clear a TLB entry regardless of the designation-type field in general register $R_3$. When either operation is performed, other models may clear precisely the minimum number of entries required. Therefore, in order for a program to operate on all models, the program should not take advantage of any properties obtained by a less selective clearing on a particular model.
2. When using the clearing-by-ASCE operation to clear TLB entries associated with common segments, note that these entries may have been formed through use of address-space-control elements containing many different table origins.

The following notes apply when the invalidation-and-clearing operation is specified.
3. The clearing of TLB entries may make use of the page-table origin in a segment-table entry. Therefore, if the segment-table entry, when in the attached state, ever contained a page-table origin that is different from the current value, copies of entries containing the previous values may remain in the TLB.

4. INVALIDATE DAT TABLE ENTRY cannot be safely used to update a shared location in main storage if the possibility exists that another CPU or a channel program may also be updating the location.

5. The address of the DAT-table entry for INVALIDATE DAT TABLE ENTRY is a 64-bit address, and the address arithmetic is performed by following the normal rules for 64-bit address arithmetic, with wraparound at $2^{64}-1$. Also, offset and length fields are not used. Contrast this with implicit translation and the translations for LOAD REAL ADDRESS and STORE REAL ADDRESS, all of which may result either in wraparound or in an addressing exception when a carry occurs out of bit position 0 and which indicate an exception condition when the designated entry does not lie within its table. Accordingly, the DAT tables should not be specified to wrap from maximum storage locations to location 0, and the first designated entry and all additional entries specified by bits 53-63 of general register $R_2$ should lie within the designated table.

6. When the local-TLB-clearing facility is installed, the local-clearing control should be specified as one when the ASCE used to form the TLB entries being cleared has been attached only to the CPU on which the IDTE instruction is executed (for example, if the program is running on a uniprocessor). Otherwise, unpredictable results, including the presentation of a delayed-access-exception machine check, may occur.

On some models, use of INVALIDATE DAT TABLE ENTRY specifying clearing of only the local TLB for the cases listed above may result in significant performance improvements.

7. The $M_4$ field of the instruction is considered to be optional, as indicated by the field being contained within brackets [ ] in the assembler syntax. When the $M_4$ field is not specified, the assembler places zeros in that field of the instruction.

Invalidate Page Table Entry
IPTE $R_1,R_2[,R_3[,M_4]]$
Note:

The term "specified CPU or CPUs" has the following meaning for scope of TLBs affected by this instruction:

When the local-TLB-clearing facility is not installed, or when the facility is installed and the local-clearing-control (LC) bit in the $M_4$ field is zero, the term "specified CPU or CPUs" means all of the CPUs in the configuration.

When the local-TLB-clearing facility is installed and the LC bit in the $M_4$ field is one, the term "specified CPU or CPUs" means only the CPU executing the IPTE instruction (the local CPU). The TLBs in all other CPUs in the configuration may not be affected.

The designated page-table entries are invalidated, and the translation-lookaside buffers (TLBs) in the specified CPU or CPUs in the configuration are cleared of the associated entries.

The contents of general register $R_1$ have the format of a segment-table entry, with only the page-table origin used. The contents of general register $R_2$ have the format of a virtual address, with only the page index used. The contents of fields that are not part of the page-table origin or page index are ignored.

When the IPTE-range facility is not installed, or when the $R_3$ field is zero, the single page-table entry designated by the first and second operands is invalidated.

When the IPTE-range facility is installed and the $R_3$ field is nonzero, bits 56-63 of general register $R_3$ contain an unsigned binary integer specifying the count of additional page-table entries to be invalidated. Therefore, the number of page-table entries to be invalidated is 1-256, corresponding to a value of 0-255 in bits 56-63 of the register.

When the IPTE-range facility is not installed, the $R_3$ field is ignored but should contain zeros; otherwise, the program may not operate compatibly in the future.

The bits of the $M_4$ field are defined as follows:
Reserved: Bits 0-2 are reserved. Reserved bit positions of the $M_4$ field are ignored but should contain zeros; otherwise, the program may not operate compatibly in the future.

Local-Clearing Control (LC): When the local-TLB-clearing facility is installed, the LC bit, bit 3 of the $M_4$ field, controls whether only the TLB in the local CPU is cleared or whether the TLBs in all CPUs of the configuration are cleared. When the local-TLB-clearing facility is not installed, bit 3 of the $M_4$ field is reserved.

The page-table origin and the page index designate a page-table entry, following the dynamic-address-translation rules for page-table lookup. The page-table origin is treated as a 64-bit address, and the addition is performed by using the rules for 64-bit address arithmetic, regardless of the current addressing mode, which is specified by bits 31 and 32 of the current PSW. A carry out of bit position 0 as a result of the addition of the page index and page-table origin cannot occur. The address formed from these two components is a real or absolute address. The page-invalid bit of this page-table entry is set to one. During this procedure, the page-table entry is not inspected for whether the page-invalid bit is already one or for format errors. Additionally, the page-frame real address contained in the entry is not checked for an addressing exception.

When the IPTE-range facility is installed and the $R_3$ field is nonzero, the instruction is interruptible, and processing is as follows:

1. The invalidation process described above is repeated for each subsequent entry in the page table until either the number of additional entries specified in bits 56-63 of general register $R_3$ have been invalidated or an interruption occurs.
2. The page-index in bits 44-51 of general register $R_2$ is incremented by the number of page-table entries that were invalidated; a carry out of bit position 44 of general register $R_2$ is ignored.
3. The additional-entry count in bits 56-63 of general register $R_3$ is decremented by the number of page-table entries that were invalidated.

Therefore, when the IPTE-range facility is installed, the $R_3$ field is nonzero, and an interruption occurs (other than one that causes termination), general registers $R_2$ and $R_3$ have been updated, so that the instruction, when reexecuted, resumes at the point of interruption.

When the IPTE-range facility is not installed, or when the $R_3$ field is zero, the contents of registers $R_2$, and $R_3$ remain unchanged.

For each page-table entry that is invalidated, the entire page-table entry appears to be fetched concurrently from storage as observed by other CPUs. Subsequently, the byte containing the page-invalid bit is stored. The fetch access to each page-table entry is subject to key-controlled protection, and the store access is subject to key-controlled protection and low-address protection.

A serialization function is performed before the operation begins and again after the operation is completed. As is the case for all serialization operations, this serialization applies only to this CPU; other CPUs are not necessarily serialized.

If no exceptions are recognized, this CPU clears selected entries from its TLB. Then if the local-TLB-clearing facility is not installed, or if the facility is installed and LC bit in the $M_4$ field is zero, this CPU signals all CPUs in the configuration to clear selected entries from their TLBs. For each page-table entry invalidated, each affected TLB is cleared of at least those entries that have been formed using all of the following:

The page-table origin specified by general register $R_1$

The page index specified by general register $R_2$

The page-frame real address contained in the designated page-table entry

The execution of INVALIDATE PAGE TABLE ENTRY is not completed on the CPU which executes it until the following occur:

1. All page-table entries corresponding to the specified parameters have been invalidated.
2. All entries corresponding to the specified parameters have been cleared from the TLB of this CPU. When the local-TLB-clearing facility is installed and the LC bit in the $M_4$ field is one, the execution of INVALIDATE PAGE TABLE entry is complete at this point and the following step is not performed.
3. When the local-TLB-clearing facility is not installed, or when the facility is installed and LC bit in the $M_4$ field is zero, all other CPUs in the configuration have completed any storage accesses, including the updating of the change and reference bits, by using TLB entries corresponding to the specified parameters.

Special Conditions

When the IPTE-range facility is installed, the $R_3$ field is nonzero, and the page index in general register $R_2$ plus the additional-entry count in general register $R_3$ is greater than 255, a specification exception is recognized.

The operation is suppressed on all addressing and protection exceptions.

Condition Code:

The code remains unchanged.

Program Exceptions:

Addressing (page-table entry)

Privileged operation

Protection (fetch and store, page-table entry, key-controlled protection, and low-address protection)

Specification

Programming Notes:

1. The selective clearing of entries may be implemented in different ways, depending on the model, and, in general, more entries may be cleared than the minimum number required. Some models may clear all entries which contain the page-frame real addresses obtained from the page-table entries in storage. Others may clear all entries which contain the designated page index (or indices), and some implementations may clear precisely the minimum number of entries required. Therefore, in order for a program to operate on all models, the program should not take advantage of any properties obtained by a less selective clearing on a particular model.
2. The clearing of TLB entries may make use of the page-frame real addresses in the page-table entries. Therefore, if the page-table entries, when in the attached state, ever contained page-frame real addresses that are different from the current values, copies of entries containing the previous values may remain in the TLB.
3. INVALIDATE PAGE TABLE ENTRY cannot be safely used to update a shared location in main storage if the possibility exists that another CPU or a channel program may also be updating the location.
4. When the IPTE-range facility is installed and the $R_3$ field is nonzero, the following applies:
   a. All of the page-table entries to be invalidated must reside in the same page table. A specification exception is recognized if the page index in general register $R_1$ plus the additional-entry count in general register $R_3$ is greater than the maximum page index of 255.
   b. The number of page-table entries that are invalidated by INVALIDATE PAGE TABLE ENTRY may vary from one execution to another.
   c. The instruction cannot be used for situations where the program must rely on uninterrupted execution of the instruction. Similarly, the program should normally not use INVALIDATE PAGE TABLE ENTRY to invalidate a page-table entry, the page-frame-real address of which designates the 4K-byte block containing the instruction or of an execute-type instruction that executes the IPTE.
5. When the local-TLB-clearing facility is installed, the local-clearing control should be specified as one when the ASCE used to form the TLB entries being cleared has been attached only to the CPU on which the IPTE instruction is executed (for example, if the program is running on a uniprocessor). Otherwise, unpredictable results, including the presentation of a delayed-access-exception machine check, may occur.

On some models, use of INVALIDATE PAGE TABLE ENTRY specifying clearing of only the local TLB for the cases listed above may result in significant performance improvements.
6. The $R_3$ and $M_4$ fields of the instruction are considered to be optional, as indicated by the fields being contained within brackets [ ] in the assembler syntax. When either field is not specified, the assembler places zeros in the corresponding field of the instruction. When the $M_4$ field is coded but the $R_3$ field is not required, a zero should be coded to designate the place of the third operand.

One embodiment of a computing environment 100 incorporating and using one or more aspects is described with reference to FIG. 1. Computing environment 100 is based, for instance, on the z/Architecture offered by International Business Machines Corporation, Armonk, N.Y. The z/Architecture is described in the IBM® publication entitled, "z/Architecture Principles of Operation," IBM Publication No. SA22-7832-08, August 2010. (IBM® is a registered trademark of International Business Machines Corporation, Armonk, N.Y., U.S.A. Other names used herein may be registered trademarks, trademarks or product names of International Business Machines Corporation or other companies.) In one example, a computing environment based on the z/Architecture includes an eServer zSeries, offered by International Business Machines Corporation, Armonk, N.Y.

As one example, computing environment 100 includes a central processor complex (CPC) 102 coupled to a controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and Licensed Internal Code (commonly referred to as microcode) keeps a program in a logical partition from interfering with a program in a different logical partition. This allows several different logical partitions to operate on a single or multiple physical processors in a time sliced manner. In this particular example, each logical partition has a resident operating system 110, which may differ for one or more logical partitions. In one embodiment, operating system 110 is the z/OS operating system, offered by International Business Machines Corporation, Armonk, N.Y.

Central processors 106 are physical processor resources that are allocated to the logical partitions. For instance, a logical partition 104 includes one or more logical processors, each of which represents all or a share of a physical processor resource 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

Controller 120, which is coupled to the central processor complex, includes centralized logic responsible for arbitrating between different processors issuing requests. For instance, when controller 120 receives a request, it determines that the requester is the master processor for that request and that the other processors are slave processors; it broadcasts messages; and otherwise, handles requests. One example of a controller is described in U.S. Pat. No. 6,199,219, entitled "System Serialization With Early Release Of Individual Processor," Webb et al., Sep. 12, 2000, which is hereby incorporated herein by reference in its entirety. Further details are also described with reference to FIG. 2.

Figure 2:
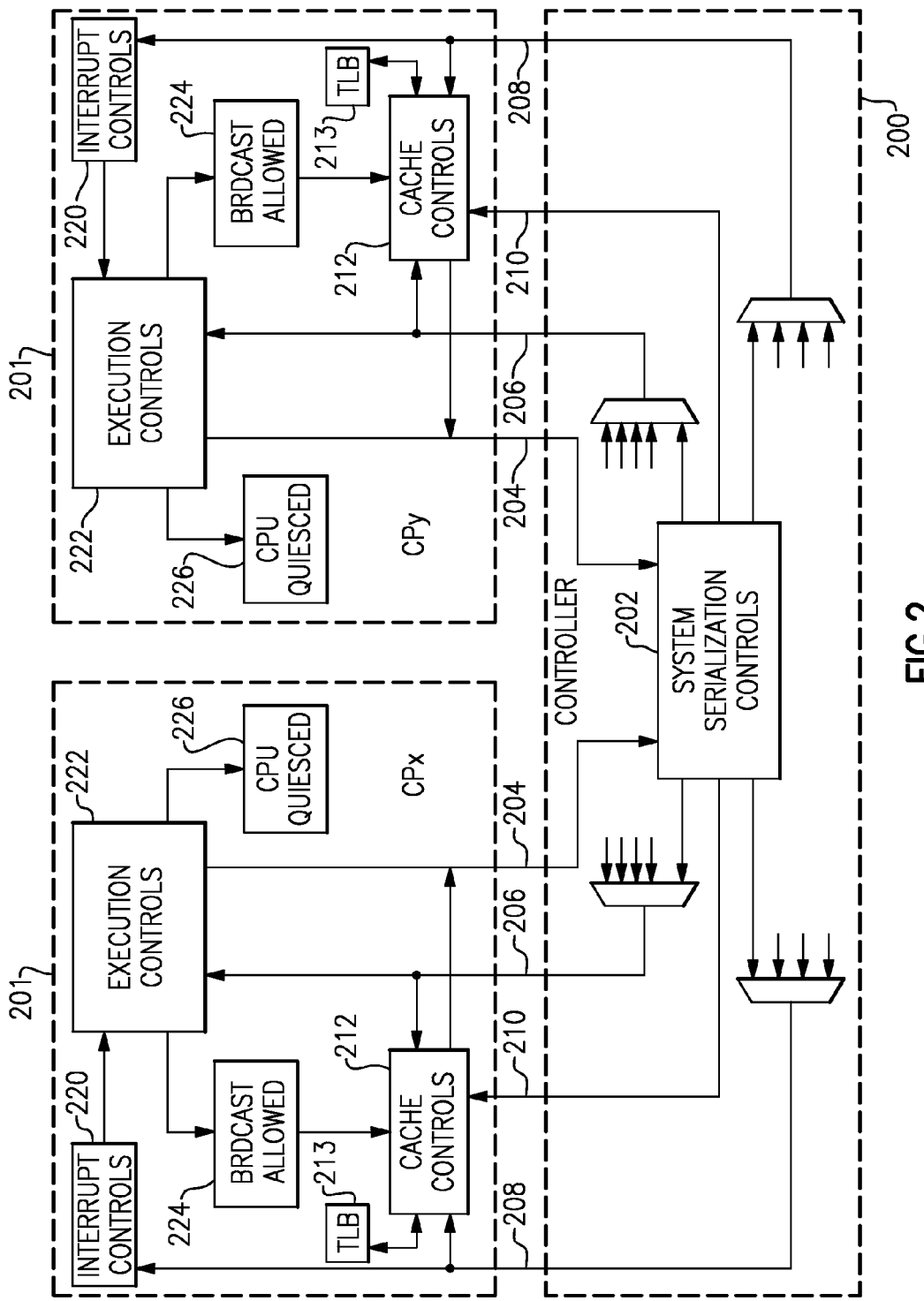
FIG. 2 depicts one embodiment of further details associated with a controller of FIG. 1.

FIG. 2 depicts one example of a controller 200 coupled to a plurality of central processors (CPUs) 201. In this example, two central processors are depicted. However, it will be understood that more than two processors may be coupled to controller 200.

Controller 200 includes various controls including, for instance, system serialization controls 202. The system serialization controls are used to ensure that operations that are to be serialized, such as invalidate instructions, are serialized, in that only one such instruction is in progress at one time in the computing environment. It also monitors the sequence of events for that operation.

Controller 200 is coupled to each central processor via various interfaces. For instance, an interface 204 is used by the Licensed Internal Code in a central processor to send "control" commands to the controller, which specify an action to be taken, and to send "sense" commands, which return information from the controller. Another interface is a response bus 206, which is used to return information from the controller for the "sense" commands. The response bus is also used to communicate command status for "control" commands, and may be set from a plurality of sources within the controller, including the system serialization controls. A central processor can use this interface to sense the state of the system serialization controls in controller 200.

A further interface is interface 208, which is used by the controller to send commands to each CPU. This may also be controlled from a plurality of sources within the controller, including system serialization controls 202. A yet further interface is interface 210, which provides signals to cache controls 212 of central processor 201. Cache controls 212 process commands, in response to the signals. In one example, cache controls 212 process commands that affect one or more buffers, such as Translation Lookaside Buffers (TLBs) 213, as described in further detail below.

In addition to cache controls 212, central processor 201 includes various other controls, including, for instance, interrupt controls 220 and execution controls 222. In response to particular events, interrupt controls 220 cause an internal interruption to be pending in the CPU, which in turn, causes execution controls 222 to suspend program instruction processing, at the next interruptible point. In response to the interruption, execution controls 222 invokes a Licensed Internal Code routine to set a broadcast operation allowed latch 224 to enable cache controls 212 to process pending commands.

Central processor 201 also includes a Central Processing Unit (CPU) quiesced latch 226 that indicates whether or not the central processor is quiesced. The term CPU and Processor may be used interchangeably in the specification.

The above described computing environment is only one example. Many variations are possible. For example, one or more partitions can be running in different architecture modes. Further, as another example, the environment need not be based on the z/Architecture, but instead, can be based on other architectures offered by Intel, Sun Microsystems, as well as others. Moreover, an environment may include an emulator (e.g., software or other emulation mechanisms), in which a particular architecture or subset thereof is emulated. In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

Further details of an emulation environment are described with reference to FIG. 3. As one example, a host computer 300 is capable of emulating another architecture, computer and/or processing capabilities of another computer. For instance, host computer 300 is based on an Intel architecture; a RISC architecture, such as PowerPC; a SPARC architecture, offered by Sun Microsystems; or another architecture, and is capable of emulating the z/Architecture of IBM® or another architecture of IBM® or another entity.

Host computer 300 includes, for instance, a memory 302 to store instructions and data; an instruction fetch unit 304 to fetch instructions from memory 302, and to optionally, provide local buffering for the fetched instructions; an instruction decode unit 306 to receive instructions from instruction fetch unit 304 and to determine the type of instructions that have been fetched; and an instruction execution unit 308 to execute the instructions. Execution may include loading data into a register from memory 302; storing data back to memory from a register; or performing some type of arithmetic or logical operation, as determined by the decode unit.

In one example, each unit described above is implemented in software. For instance, the operations being performed by the units are implemented as one or more subroutines within emulator software. In another example, one or more of the operations are implemented in firmware, hardware, software or some combination thereof.

Figure 3:
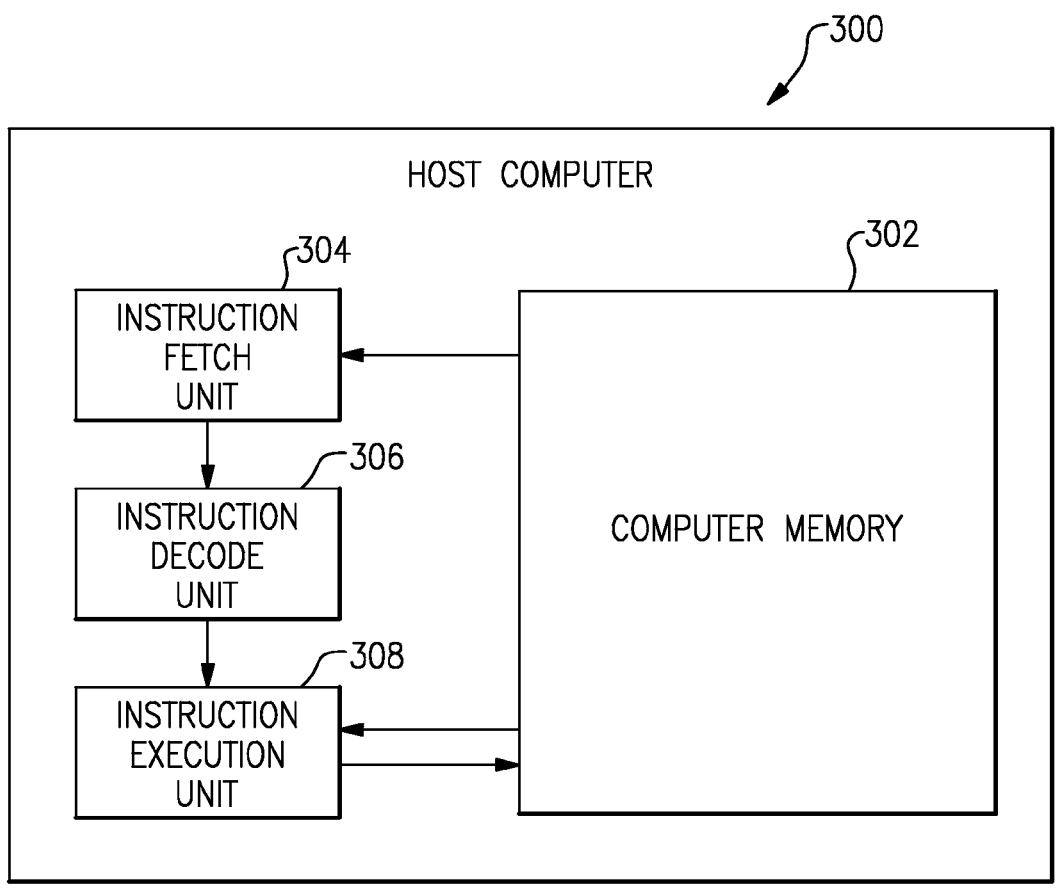
FIG. 3 depicts one embodiment of a host computer that can emulate another computer.

Further, although FIG. 3 is described with reference to emulation, the environment of FIG. 3 need not be an emulation environment. In another example, instructions are executed in a native environment, and the operations are implemented in hardware, firmware, software or some combination thereof.

A computing environment may include virtual storage, as well as main storage. Virtual storage may far exceed the size of main storage available in the configuration and is normally maintained in auxiliary storage. Virtual storage is considered to be composed of blocks of addresses, called pages. The most recently referred to pages of virtual storage are assigned to occupy blocks of physical main storage. As a user refers to pages of virtual storage that do not appear in main storage, the virtual pages are brought in to replace the pages in main storage that are less likely to be used. The swapping of pages in storage may be performed by the operating system without the user's knowledge.

The addresses used to designate locations in virtual storage are referred to as virtual addresses. A block of sequential virtual addresses spanning, for instance, up to 4 k bytes, is referred to as a page. Similarly, a block of sequential virtual pages spanning, for instance, up to 1 M bytes is referred to as a segment; and a block of sequential virtual segments spanning, for instance, up to 2 G bytes, is referred to as a region. Further, a sequence of virtual addresses associated with virtual storage designated by an address space control element (ASCE) is called an address space. Address spaces may be used to provide degrees of isolation between users. An address space can include one or more regions, one or more segments, one or more pages, or some combination thereof.

Associated with the different types of units of storage (e.g., regions, segments, pages) are data structures to be used in processing associated with the units of storage. For example, associated with regions are region tables; associated with segments are segment tables; and associated with pages are page tables. These tables are used, for instance, during translation (e.g., Dynamic Address Translation) of a virtual address to a real address that is used to access main storage. The tables to be used in translation, referred to herein as translation tables, are designated by an address space control element (ASCE). A unit of virtual storage that is not currently assigned to main storage is called invalid. The invalid state of a unit of virtual storage is indicated by an invalid indicator in the data structure associated with the unit.

The dynamic address translation mechanism is implemented, in one embodiment, such that the information derived from the translation tables (e.g., region tables, segment tables and/or page tables) through the DAT process is maintained in one or more buffers located within the processors, referred to herein as Translation Lookaside Buffers, in order to enhance performance of address translation. That is, during the translation, the buffers are checked for the needed information, and then, if the information is not in the buffers, one or more of the translation tables are accessed.

In emulation mode, the specific instruction being emulated is decoded, and a subroutine is built to implement the individual instruction, as in a C subroutine or driver, or some other technique is used for providing a driver for the specific hardware, as is within the skill of those in the art after understanding the description of an embodiment. Various software and hardware emulation patents including, but not limited to, U.S. Pat. No. 5,551,013, entitled "Multiprocessor for Hardware Emulation," Beausoleil et al.; U.S. Pat. No. 6,009,261, entitled "Preprocessing of Stored Target Routines for Emulating Incompatible Instructions on a Target Processor," Scalzi et al.; U.S. Pat. No. 5,574,873, entitled "Decoding Guest Instruction to Directly Access Emulation Routines That Emulate the Guest Instructions," Davidian et al.; U.S. Pat. No. 6,308,255, entitled "Symmetrical Multiprocessing Bus and Chipset Used for Coprocessor Support Allowing Non-Native Code to Run in a System," Gorishek et al.; U.S. Pat. No. 6,463,582, entitled "Dynamic Optimizing Object Code Translator For Architecture Emulation and Dynamic Optimizing Object Code Translation Method," Lethin et al.; and U.S. Pat. No. 5,790,825, entitled "Method for Emulating Guest Instructions on a Host Computer Through Dynamic Recompilation of Host Instructions," Eric Traut; each of which is hereby incorporated herein by reference in its entirety, and many others, illustrate a variety of known ways to achieve emulation of an instruction format architected for a different machine for a target machine available to those skilled in the art, as well as those commercial software techniques used by those referenced above.

Compare and Replace DAT Table Entry (CRDTE)

Described is a CPU instruction (COMPARE AND REPLACE DAT TABLE ENTRY) that may replace a valid DAT table entry with a new entry, and purge the TLB of any copies of (at least) the single entry on all CPUs in the configuration. This instruction does not require that any active tasks be suspended, and it may not purge more entries than are necessary.

When the CRDTE instruction is executed, the selective clearing of entries may be implemented in different ways, depending on the model, and, in general, more entries may be cleared than the minimum number required. Some models may clear all entries which contain the page-frame real addresses obtained from the page-table entries in storage.

If the control program needs to replace a valid entry in a DAT table (that is, a table entry that is potentially in use by other CPUs), it may perform one of the following operations:

Suspend execution of all tasks that may use this DAT-table entry on all CPUs in the configuration, invalidate and purge the entry on all CPUs (for example, using IPTE), replace the invalidated entry with a new entry, and redispatch the suspended tasks.

Replace the DAT table entry and purge the entire TLB on all CPUs in the configuration (for example, using CSPG).

The first option is complex, in that it requires un-dispatching and re-dispatching tasks. The second option is sub-optimal in that it requires the purging of the entire TLB, even though only one entry is being changed.

In one embodiment, a computer processor obtains an instruction for processing. Based on the opcode, the machine processes the Compare and Replace DAT Table Entry (CRDTE) instruction. The CRDTE instruction has the following format:

| opcode | $R_3$ | $M_4$ | $R_1$ | $R_2$ |
---

The $R_1$ and $R_2$ fields each designate an even-odd pair of general registers and must designate an even-numbered register; otherwise, a specification exception is recognized. General register $R_1$ (the even register of the pair) contains the first operand. The first operand may be called the compare value. General register $R_1+1$ (the odd register of the pair) may be called the replacement value.

In carrying out the instruction, the first and a second operand are compared. The first operand is located in general register R1. The second operand is a designated by general registers $R_2$ and $R_2+1$. $R_2$ and $R_2+1$ contain addressing information such as designated-table type (DTT), and effective index into the table to locate the second operand.

Once the first and second operands are obtained they are then compared, and if they are equal, the contents of general register $R_1+1$ are stored at the second-operand location, and the specified CPU or CPUs in the configuration are cleared of (1) all TLB table entries of the designated type formed through the use of the replaced entry in storage, and (2) all lower-level TLB table entries formed through the use of the cleared higher-level TLB table entries. The TLB entries cleared may optionally be limited to entries formed to translate addresses in a specified address space. The resulting condition code is set to 0.

If the first and second operands are not equal, the second operand is loaded at the first-operand location and the resulting condition code is set to 1. The $M_4$ field may determine whether to clear the TLBs of all CPUs in a configuration or only the TLB in the CPU executing the instruction.

Figure 4:
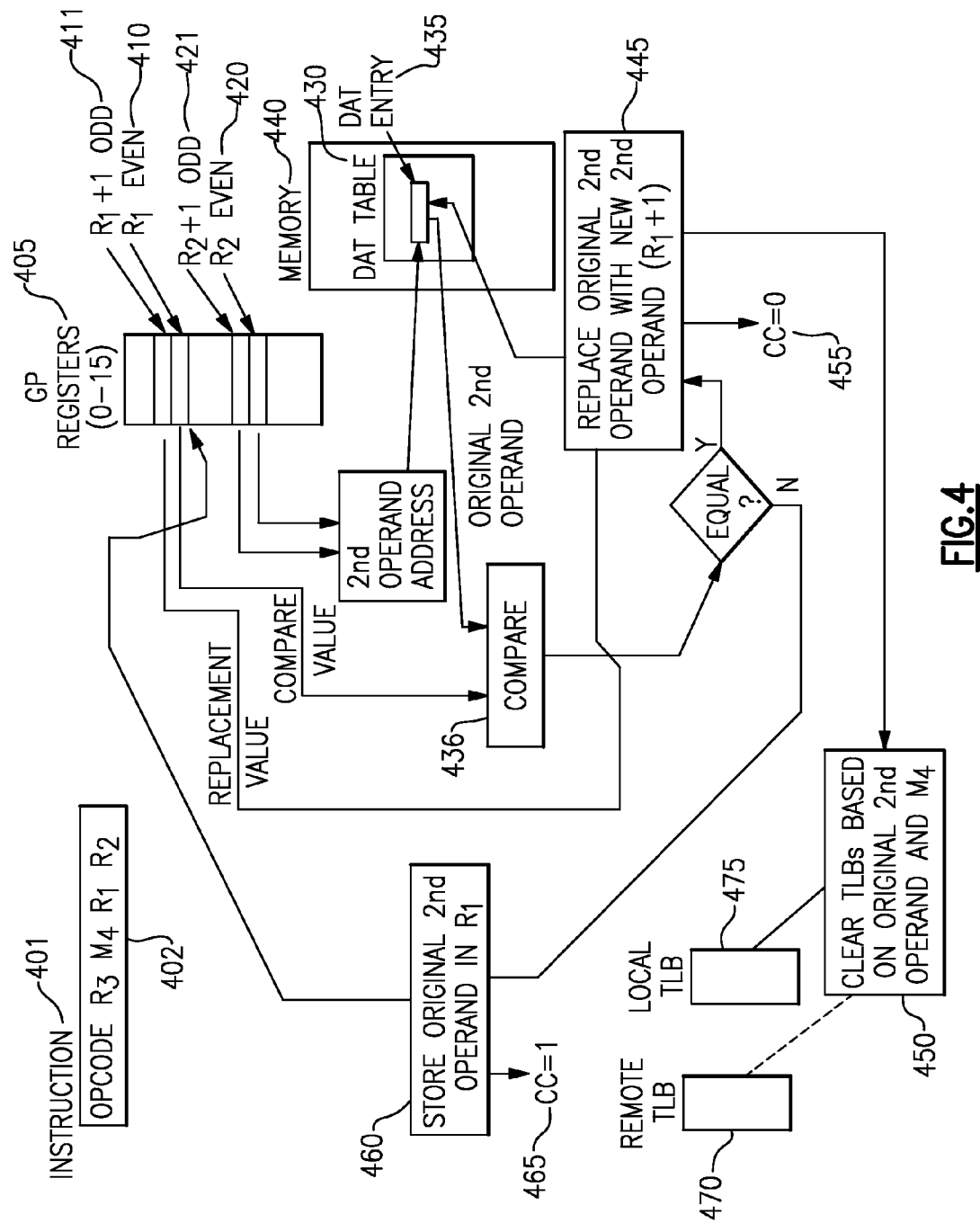
FIG. 4 depicts the instruction image of the COMPARE AND REPLACE DAT TABLE ENTRY instruction, and the operation thereof.

FIG. 4 displays a chart of an embodiment.

In one embodiment, a computer processor obtains a CRDTE instruction 0401 for processing. Based on the opcode, the machine processes the Compare and Replace DAT Table Entry instruction.

The $R_1$ and $R_2$ fields each designate an even-odd pair of general registers 0405 and must designate an even-numbered register; otherwise, a specification exception is recognized. General register $R_1$ (the even register of the pair) 0410 contains the first operand in bit positions 0-63. The first operand may be called the compare value. Bit positions 0-63 of general register $R_1+1$ (the odd register of the pair) 0411 may be called the replacement value.

In executing the instruction, the first and a second operand are compared. The first operand is located in general register R1 0410. The second operand is a doubleword in storage designated by general registers $R_2$ 0420 and $R_2+1$ 0421. Bits 59-61 of general register $R_2$ are the designated-table type (DTT), specifying the bits in general register $R_2$ that form the origin of a table 0430 in storage 0440; the DTT also specifies the bits in general register $R_2+1$ that are used as the effective index into the table to locate the second operand 0435.

Once the first and second operands are compared 0436, if they are equal, the contents of general register $R_1+1$ are stored at the second-operand location 0445, and as shown in 0450, the specified CPU or CPUs in the configuration are cleared of (1) all TLB table entries of the designated type formed through the use of the replaced entry in storage, and (2) all lower-level TLB table entries formed through the use of the cleared higher-level TLB table entries. The TLB entries cleared may optionally be limited to entries formed to translate addresses in a specified address space. The resulting condition code is set to 0 as shown in 0455.

If the first and second operands are unequal, the second operand is loaded at the first-operand location 0460. The resulting condition code is set to 1 as shown in 0465.

The instruction 0401 may utilize the $M_4$ field 0402 to determine whether to selectively clear the TLBs of all CPUs in a configuration 1570 or only the TLB in the CPU executing the instruction 1575. The $M_4$ field contains a Local Clearing (LC) control. If the LC control in the $M_4$ field is zero, the TLBs in all the CPUs in the configuration will be affected. If the LC control field in the $M_4$ field is one, only the TLB associated with the CPU executing the Compare and Replace DAT Table Entry instruction may be affected. The TLBs in all other CPUs in the configuration may not be affected.

Note: The term "specified CPU or CPUs" has the following meaning for scope of TLBs affected by this instruction:

When the local-clearing (LC) control in the $M_4$ field is zero, the term "specified CPU or CPUs" means all of the CPUs in the configuration.

When the LC control in the $M_4$ field is one, the term "specified CPU or CPUs" means only the CPU executing the COMPARE AND REPLACE DAT TABLE ENTRY instruction (the local CPU). The TLBs in all other CPUs in the configuration may not be affected.

The first and second operands are compared. If they are equal, the contents of general register $R_1+1$ are stored at the second-operand location, and the specified CPU or CPUs in the configuration are cleared of (1) all TLB table entries of the designated type formed through the use of the replaced entry in storage, and (2) all lower-level TLB table entries formed through the use of the cleared higher-level TLB table entries. The TLB entries cleared may optionally be limited to entries formed to translate addresses in a specified address space.

If the first and second operands are unequal, the second operand is loaded at the first-operand location. However, on some models, the second operand may be fetched and subsequently stored back unchanged at the second-operand location. This update appears to be a block-concurrent interlocked-update reference as observed by other CPUs. The result of the comparison is indicated by the condition code.

Figure 5:
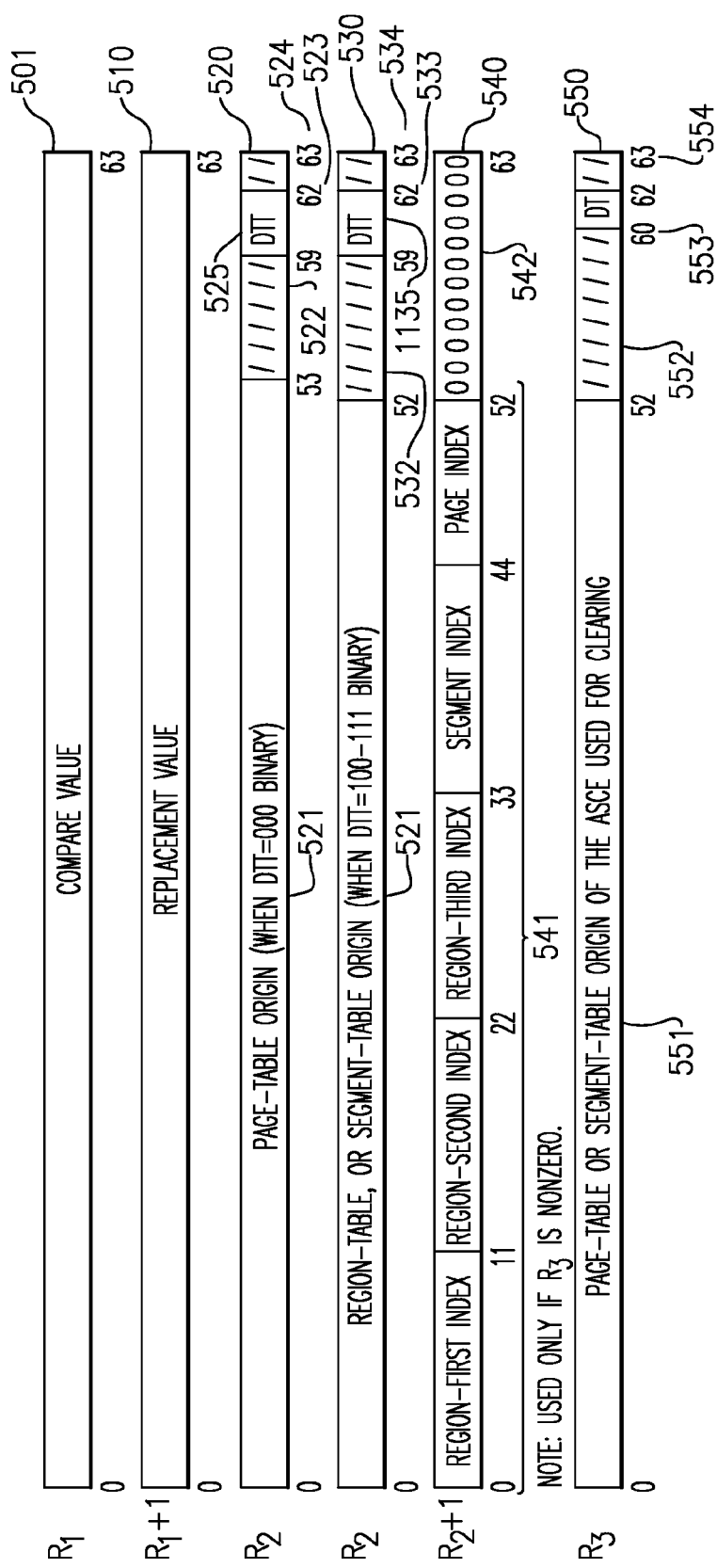
FIG. 5 depicts the register operands of the COMPARE AND REPLACE DAT TABLE ENTRY instruction.

The $R_1$ and $R_2$ fields each designate an even-odd pair of general registers and must designate an even-numbered register; otherwise, a specification exception is recognized. With regards now to FIG. 5, the first operand is called the compare value 0501 and is contained in bit positions 0-63 of general register $R_1$. Bit positions 0-63 of general register $R_1+1$ are called the replacement value 0510.

The second operand is a doubleword in storage designated by general registers $R_2$ and $R_2+1$ 0540. Bits 59-61 of general register $R_2$ are the designated-table type (DTT), specifying the bits in general register $R_2$ that form the origin of a table in storage; the DTT also specifies the bits in general register $R_2+1$ 0540 that are used as the effective index into the table to locate the second operand, as follows:

| DTT (bits 59-61 of Register $R_2$) | Table Type | Table Origin Bits in Register $R_2$ | Effective Index Bits in Register $R_2$ + 1 |
|---|---|---|---|
| 000 | Page | 0-52 | 44-51 |
| 001-011 | — | — | — |
| 100 | Segment | 0-51 | 33-43 |
| 101 | Region third | 0-51 | 22-32 |
| 110 | Region second | 0-51 | 11-21 |
| 111 | Region first | 0-51 | 0-10 |

When the DTT is 000 binary as shown in 0520, the contents of bit positions 0-52 of general register $R_2$, with eleven zeros appended on the right, 0521, form the table origin, and bits 53-58 in 0522, 62 in 0523, and 63 in 0524 of the register are ignored. When the DTT is 100-111 binary as shown in 0530, the contents of bit positions 0-51 of general register $R_2$, with twelve zeros appended on the right, 0531 form the table origin, and bits 52-58 in 0532, 62 in 0533, and 63 in 0534 of the register are ignored. DTT values of 001, 010, and 011 binary are invalid; a specification exception is recognized if the DTT is invalid.

Bits 0-51 of general register $R_2+1$ 0540 have the format of the region index, segment index, and page index of a virtual address. The part of bits 0-51 in 0541 normally used by DAT to select an entry in the type of table designated by the DTT is called the effective index. The part of bits 0-51 of general register $R_2+1$ to the right of the effective index is ignored. Bit positions 52-63 of general register $R_2+1$, 0542, are reserved and must contain zeros; otherwise, a specification exception is recognized.

If $R_3$ 0550 is nonzero, the contents of general register $R_3$ have the format of an address-space-control element with only the table origin, bits 0-51 in 0551, and designation-type control (DT), bits 60 and 61 in 0553, used. These are used to select TLB entries to be cleared. Bits 52-59 in 0552, 62 in 0554, and 63 in 0555 of general register $R_3$ are ignored. If $R_3$ is zero, the entire contents of general register 0 are ignored, and TLB entries are cleared regardless of the ASCE used to form them.

Figure 6:
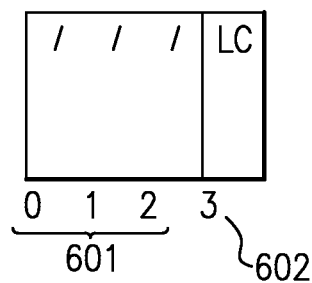
FIG. 6 depicts the $M_4$ field.

The $M_4$ field is shown in FIG. 6.

The bits of the $M_4$ field are defined as follows:

Reserved: Bits 0-2 as shown in 0601 are reserved. Reserved bit positions of the $M_4$ field are ignored but should contain zeros; otherwise, the program may not operate compatibly in the future.

Local-Clearing Control (LC):

The LC bit, bit 3 of the $M_4$ field 0602, controls whether only the TLB in the local CPU is cleared, or whether the TLBs in all CPUs of the configuration are cleared.

When the first and second operands are equal, the contents of general register $R_1+1$ are stored at the second-operand location, and the translation-lookaside buffers (TLBs) in the specified CPUs in the configuration are cleared of (1) all TLB table entries of the designated type formed through the use of the original contents of the second operand in storage (that is, the contents of the second operand before it is replaced with the replacement value), and (2) all lower-level TLB table entries formed through the use of the cleared higher-level TLB table entries. The TLB entries cleared may optionally be limited to entries formed to translate addresses in a specified address space.

Depending on the table type, the table origin in general register $R_2$ and effective index in general register $R_2+1$ designate a table entry in accordance with the rules in "Lookup in a Table Designated by an Address-Space-Control Element" or "Page-Table Lookup" in the z/Architecture Principles of Operation," IBM Publication No. SA22-7832-08, August 2010, except that a carry from bit position 0 of the resulting address is always ignored, and the index is not checked against a table-length field. The table origin is treated as a 64-bit address, and the addition is performed by using the rules for 64-bit address arithmetic, regardless of the current addressing mode specified by bits 31 and 32 of the current PSW. The address formed from these two components is a real or absolute address. The contents of the table entry are not examined for validity, and no exception conditions are recognized due to the contents of the table entry.

The fetch and store of the table entry are performed as a block-concurrent interlocked update. The fetch access to the entry is subject to key-controlled protection, and the store access is subject to key-controlled protection and low-address protection.

A serialization function is performed before the operation begins and again after the operation is completed. As is the case for all serialization operations, this serialization applies only to this CPU; other CPUs are not necessarily serialized.

When the first and second operands are equal, this CPU clears selected entries from its TLB. In addition to the clearing of the local CPU, if the LC bit in the $M_4$ field is zero, all other CPUs in the configuration are signalled to clear selected entries from their TLBs. Each TLB is cleared of at least those entries for which all of the following conditions are met:

The effective index in general register $R_2+1$ matches the corresponding index in the TLB table entry of type designated by the DTT field in bits 59-61 of general register $R_2$. If the model implements a composite TLB entry that includes the index designated by the DTT field, bits to the left of the effective index in general register $R_2+1$ also match any corresponding bits provided in the designated TLB table entry.

Either the $R_3$ field is zero, or the table-origin and designation-type fields in general register $R_3$ match the table-origin and designation-type fields in the address-space-control element (ASCE) used to form the TLB table entry.

If the $R_3$ field is zero, then the condition described in this step does not apply.

If EDAT-1 applies and the entry replaced in storage is a segment-table entry, or if EDAT-2 applies and the entry replaced in storage is a region-third-table entry, the format control in the replaced entry matches that of the TLB entry.

If the replaced entry in storage designates a lower-level translation table, the lower-level table origin in the entry matches the table-origin field in the TLB table entry.

If EDAT-1 applies and the entry replaced in storage is a segment-table entry in which the format control is one, or if EDAT-2 applies and the entry replaced in storage is a region-third-table entry in which the format control is one, the segment-frame absolute address or region-frame absolute address, respectively, in the replaced entry matches that of the TLB entry.

Each affected TLB is also cleared of at least any lower-level TLB table entries for which all of the following conditions are met:

The lower-level TLB table entry was formed through use of the replaced entry in storage or through use of a higher-level TLB table entry formed through use of either the replaced entry in storage or a TLB entry cleared in this process.

Either the $R_3$ field is zero or the table-origin and designation-type fields in general register $R_3$ match the table-origin and designation-type fields in the address-space-control element (ASCE) used to form the lower-level TLB table entry. This ASCE may be one that attached a translation path containing a higher-level table entry that attached the lower-level table entry in storage from which the lower-level TLB table entry was formed, or it may be one that made usable a higher-level TLB table entry that attached the lower-level table entry in storage from which the lower-level TLB table entry was formed.

If the $R_3$ field is zero, then the condition described in this step does not apply.

If EDAT-1 applies and the entry replaced in storage is a segment-table entry, or if EDAT-2 applies and the entry replaced in storage is a region-third-table entry, the format control in the replaced entry matches that of the TLB entry.

If the entry in storage designates a lower-level translation table, the lower-level table origin in the entry matches the table-origin field in the TLB table entry.

When the first and second operands are equal, the execution of COMPARE AND REPLACE DAT TABLE ENTRY is not completed on the CPU which executes it until the following occurs:

1. All entries meeting the criteria specified above have been cleared from the TLB of this CPU. When the LC control in the $M_4$ field is one, execution of COMPARE AND REPLACE DAT TABLE ENTRY is complete, and the following step is not performed.

2. When the LC control in the $M_4$ field is zero, all other CPUs in the configuration have completed any storage accesses, including the updating of the change and reference bits.

The operation does not necessarily have any effect on TLB real-space entries.

Special Conditions

A specification exception is recognized, and the operation is suppressed if any of the following is true:

Either the $R_1$ or $R_2$ field is odd.

The DTT fields, bit positions 59-61 of general register $R_2$, contain 001, 010, or 011 binary.

Bit positions 52-63 of general register $R_2+1$ contain non-zero values.

The operation is suppressed on all addressing and protection exceptions.

Resulting Condition Code:

0—First and second operands equal, second operand replaced by contents of general register R1+1

1—First and second operands unequal, first operand replaced by second operand

2—

3—

Program Exceptions:

Addressing

Operation (if the enhanced-DAT facility 2 is not installed)

Privileged operation

Protection (fetch and store, region-, segment-, or page-table entry, key-controlled protection and low-address protection)

Specification

Programming Notes:

1. The selective clearing of TLB entries may be implemented in different ways, depending on the model, and, in general, more entries may be cleared than the minimum number required.

2. When clearing TLB entries associated with common segments, note that these entries may have been formed through use of address-space-control elements containing many different table origins.

3. The $M_4$ field of the instruction is considered to be optional, as indicated by the field being contained within brackets [ ] in the assembler syntax. When the $M_4$ field is not specified, the assembler places zeros in that field of the instruction.

4. The local-clearing control should be specified as one only when either of the following are true; otherwise, unpredictable results, including the presentation of a delayed-access-exception machine check, may occur.

The program is running in a uni-processor configuration.

The program is assigned to run on a single CPU and the affinity between the program and that CPU is maintained.

On some models, use of COMPARE AND REPLACE DAT TABLE ENTRY specifying clearing of only the local TLB for the cases listed above may result in significant performance improvements.

Many variations to the above environment are possible. For example, one or more aspects are equally applicable to, for instance, virtual machine emulation, in which one or more pageable entities (e.g., guests) execute on one or more processors. As one example, pageable guests are defined by the Start Interpretive Execution (SIE) architecture, one example of which is described in an IBM publication entitled, "IBM System/370 Extended Architecture," IBM Publication No. SA22-7095 (1985), which is hereby incorporated herein by reference in its entirety.

Although SIE and the z/Architecture are mentioned above, one or more aspects are equally applicable to other architectures and/or environments employing pageable entities or similar constructs.

Moreover, the various embodiments described above are just examples. For instance, although a logically partitioned environment is described herein, this is only one example. Aspects are beneficial to many types of environments, including other environments that have a plurality of zones, and non-partitioned environments. Further, there may be no central processor complexes, but yet, multiple processors coupled together. Yet further, one or more aspects are applicable to single processor environments.

Although particular environments are described herein, again, many variations to these environments can be implemented. For example, if the environment is logically partitioned, then more or fewer logical partitions may be included in the environment. Further, there may be multiple central processing complexes coupled together. These are only some of the variations that can be made. Additionally, other variations are possible. Further, the environment may include multiple controllers. Yet further, multiple quiescent requests (from one or more controllers) may be concurrently outstanding in the system. Additional variations are also possible.

Advantageously, one or more aspects can benefit from performance enhancements described in one or more of the following US patents: U.S. Pat. No. 7,530,067, entitled "Filtering Processor Requests Based On Identifiers," Siegel et al.; U.S. Pat. No. 7,020,761, entitled "Blocking Processing Restrictions Based On Page Indices," Siegel et al.; and U.S. Pat. No. 6,996,698, entitled "Blocking Processing Restrictions Based On Addresses," Siegel et al., each of which is hereby incorporated herein by reference in its entirety.

As used herein, the term "processing unit" includes pageable entities, such as guests; processors; emulators; and/or other similar components. Moreover, the term "by a processing unit" includes on behalf of a processing unit. The term "buffer" includes an area of storage, as well as different types of data structures, including, but not limited to, arrays; and the term "table" can include other than table type data structures. Further, the instruction can include other than registers to designate information. Moreover, a page, a segment and/or a region can be of sizes different than those described herein.

One or more of the capabilities can be implemented in software, firmware, hardware, or some combination thereof. Further, one or more of the capabilities can be emulated.

One or more aspects can be included in an article of manufacture (e.g., one or more computer program products) having, for instance, computer usable media. The media has embodied therein, for instance, computer readable program code means or logic (e.g., instructions, code, commands, etc.) to provide and facilitate capabilities. The article of manufacture can be included as a part of a computer system or sold separately.

Additionally, at least one program storage device readable by a machine embodying at least one program of instructions executable by the machine to perform the capabilities can be provided.

The flow diagrams depicted herein are just examples. There may be many variations to these diagrams or the steps (or operations) described therein. For instance, the steps may be performed in a differing order, or steps may be added, deleted or modified.

Although preferred embodiments have been depicted and described in detail herein, it will be apparent to those skilled in the relevant art that various modifications, additions, substitutions and the like can be made and these are therefore considered to be within the scope as defined in the following claims.

In a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects can be included in an article of manufacture (e.g., one or more computer program products) having, for instance, computer usable media. The media has therein, for instance, computer readable program code means or logic (e.g., instructions, code, commands, etc.) to provide and facilitate the capabilities. The article of manufacture can be included as a part of a system (e.g., computer system) or sold separately.

Figure 7:
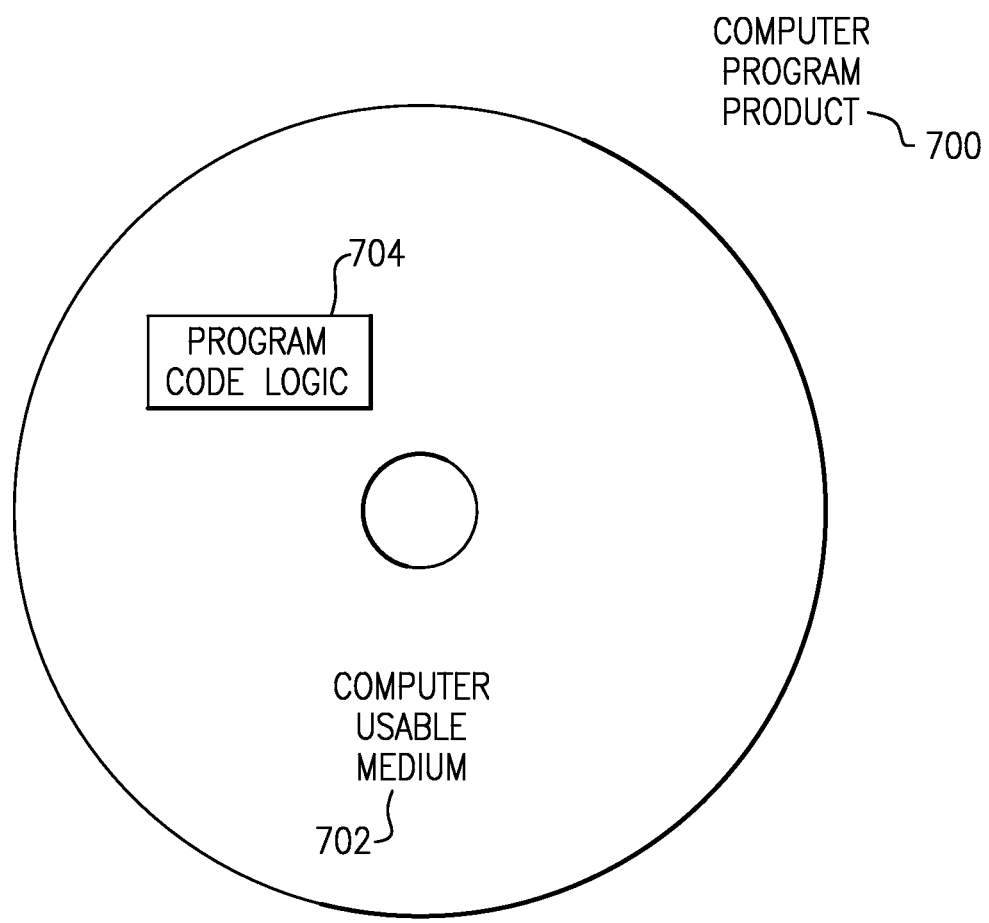
FIG. 7 depicts a computer readable medium.

One example of an article of manufacture or a computer program product incorporating one or more aspects is described with reference to FIG. 7. A computer program product 0700 includes, for instance, one or more computer usable media 0702 to store computer readable program code means or logic 0704 thereon to provide and facilitate one or more aspects. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-RAN) and DVD. A sequence of program instructions or a logical assembly of one or more interrelated modules defined by one or more computer readable program code means or logic direct the performance of one or more aspects.

We claim:

1. A computer program product for selectively clearing a local Translation Lookaside Buffer (TLB) of a processor or a plurality of Translation Lookaside Buffers of a plurality of processors, the computer program product comprising:
   computer readable storage medium having program code embodied therewith, the program code readable by a computer processor to perform a method comprising:
   executing, by the processor, an instruction, the executing comprising:
   determining one or more translation table entry locations specified by the instruction;
   based on a local-clearing (LC) control specified by the instruction being a first value, selectively clearing TLBs in a plurality of processors in a configuration of entries corresponding to the determined translation table entry location; and
   based on the local-clearing (LC) control being a second value, selectively clearing only the TLBs of the processor of the configuration executing the instruction of entries corresponding to the determined translation table entry location.

2. The program product of claim 1, the executing further comprising:
   any one of invalidating or replacing content of the determined one or more translation table entry locations.

3. The program product of claim 2, the executing further comprising:
   invalidating content of a range of one or more translation table entry locations.

4. The program product of claim 2, the executing further comprising:
   replacing content of the one or more translation table entry locations with new content.

5. The program product of claim 1, wherein the selectively clearing further comprises:
   clearing TLB entries associated with dependent translation table entries, wherein the dependent translation table entries are entries in lower level translation tables configured to be accessed by dynamic address translation of the one or more translation table entry locations.

6. The program product of claim 1, wherein based on the LC control being zero, TLBs in all of the CPUs in a configuration of entries corresponding to the determined translation table entry are selectively cleared.

7. The program product of claim 1, wherein based on the LC control being one, the TLB in the CPU executing the instruction is selectively cleared.

8. A computer system for clearing a local Translation Lookaside Buffer (TLB), the system comprising:
   a memory; and
   a processor configured to communicate with the memory, wherein the computer system is configured to perform a method, the method comprising:
   executing, by the processor, an instruction, the executing comprising:
   determining one or more translation table entry locations specified by the instruction;
   based on a local-clearing (LC) control specified by the instruction being a first value, selectively clearing TLBs in a plurality of processors in a configuration of entries corresponding to the determined translation table entry location; and
   based on the local-clearing (LC) control being a second value, selectively clearing only the TLBs of the processor of the configuration executing the instruction of entries corresponding to the determined translation table entry location.

9. The system of claim 8, the executing further comprising:
   any one of invalidating or replacing content of the determined one or more translation table entry locations.

10. The system of claim 9, the executing further comprising:
    invalidating content of a range of one or more translation table entry locations.

11. The system of claim 9, the executing further comprising:
    replacing content of the one or more translation table entry locations with new content.

12. The system of claim 8, wherein the selectively clearing further comprises:

clearing TLB entries associated with dependent translation table entries, wherein the dependent translation table entries are entries in lower level translation tables configured to be accessed by dynamic address translation of the one or more translation table entry locations.

13. The system of claim 8, wherein based on the LC control being zero, TLBs in all of the CPUs in a configuration of entries corresponding to the determined translation table entry are selectively cleared.

14. The system of claim 8, wherein based on the LC control being one, the TLB in the CPU executing the instruction is selectively cleared.

15. A computer implemented method for clearing a local Translation Lookaside Buffer (TLB), the method comprising:
   determining one or more translation table entry locations specified by the instruction;
   based on a local-clearing (LC) control specified by the instruction being a first value, selectively clearing TLBs in a plurality of processors in a configuration of entries corresponding to the determined translation table entry location; and
   based on the local-clearing (LC) control being a second value, selectively clearing only the TLBs of the processor of the configuration executing the instruction of entries corresponding to the determined translation table entry location.

16. The method of claim 15, further comprising:
   any one of invalidating or replacing content of the determined one or more translation table entry locations.

17. The method of claim 16, further comprising:
   invalidating content of a range of one or more translation table entry locations.

18. The method of claim 16, further comprising:
   replacing content of the one or more translation table entry locations with new content.

19. The method of claim 15, wherein the selectively clearing further comprises:
   clearing TLB entries associated with dependent translation table entries, wherein the dependent translation table entries are entries in lower level translation tables configured to be accessed by dynamic address translation of the one or more translation table entry locations.

20. The method of claim 15, wherein based on the LC control being zero, TLBs in all of the CPUs in a configuration of entries corresponding to the determined translation table entry are selectively cleared; and based on the LC control being one, the TLB in the CPU executing the instruction is selectively cleared.

* * * * *